US011151169B2

(12) United States Patent
Wroblewski et al.

(10) Patent No.: US 11,151,169 B2
(45) Date of Patent: Oct. 19, 2021

(54) SYSTEM AND METHOD FOR MOTION ABSTRACTION, ACTIVITY IDENTIFICATION, AND VEHICLE CLASSIFICATION

(71) Applicant: The United States of America as represented by the Secretary of the Navy, San Diego, CA (US)

(72) Inventors: Ronald J. Wroblewski, San Diego, CA (US); Michael W. Walton, San Diego, CA (US)

( * ) Notice: Subject to any disclaimer, the term of this patent is extended or adjusted under 35 U.S.C. 154(b) by 112 days.

(21) Appl. No.: 16/176,228

(22) Filed: Oct. 31, 2018

(65) Prior Publication Data

US 2020/0133961 A1 Apr. 30, 2020

(51) Int. Cl.
*G06N 3/08* (2006.01)
*G06F 16/28* (2019.01)

(52) U.S. Cl.
CPC ............ *G06F 16/287* (2019.01); *G06N 3/08* (2013.01)

(58) Field of Classification Search
CPC ........ G06F 16/287; G06N 3/08; G06N 5/003; G06N 20/20; G06N 3/0445; G06N 3/084; G06N 5/022; G08G 3/00
See application file for complete search history.

(56) References Cited

U.S. PATENT DOCUMENTS

| | | | |
|---|---|---|---|
| 5,754,429 A * | 5/1998 | Ishihara | G08G 3/00 340/958 |
| 5,768,580 A | 6/1998 | Wical | |
| 5,949,367 A * | 9/1999 | Trompf | G06K 9/6267 342/90 |
| 7,093,200 B2 | 8/2006 | Schreiber et al. | |
| 7,490,092 B2 | 2/2009 | Sibley et al. | |
| 2006/0129288 A1 * | 6/2006 | Yanagi | G01S 13/86 701/21 |
| 2008/0079608 A1 * | 4/2008 | Morrell | G08G 3/00 340/984 |
| 2009/0016599 A1 * | 1/2009 | Eaton | G06N 20/00 382/159 |

(Continued)

FOREIGN PATENT DOCUMENTS

EP 2610636 A1 * 7/2013 ........... G01S 13/726

OTHER PUBLICATIONS

R. J. Wroblewski, "Semantic Indexing of Big Data Using a Hierarchical, Multidimensional Scheme," Int'l Conf. on Advances in Big Data Analytics (2014).

(Continued)

*Primary Examiner* — Pierre M Vital
*Assistant Examiner* — Andrew N Ho
(74) *Attorney, Agent, or Firm* — Naval Information Warfare Center, Pacific; Kyle Eppele; Matthew D. Pangallo

(57) ABSTRACT

Motion abstraction includes ontologies having taxonomies for classification of various types of vessels (entities) and their movements based on inputted raw data. Kinematic-data abstraction, activity identification, entity classification, and entity identification, can be performed such that kinematic data is decomposed using an ontology describing motion, activities are decomposed using an ontology describing activities, and entity classes are decomposed using an ontology describing entity classes having unique-entity instances.

18 Claims, 28 Drawing Sheets

(56) References Cited

U.S. PATENT DOCUMENTS

| | | | | |
|---|---|---|---|---|
| 2009/0150311 | A1* | 6/2009 | George | G06N 3/08 |
| | | | | 706/12 |
| 2010/0046799 | A1* | 2/2010 | Saptharishi | G06T 7/277 |
| | | | | 382/103 |
| 2014/0012848 | A1* | 1/2014 | Denney | G06F 16/353 |
| | | | | 707/737 |
| 2014/0097979 | A1* | 4/2014 | Nohara | G01S 13/87 |
| | | | | 342/90 |
| 2015/0266455 | A1* | 9/2015 | Wilson | B60W 30/10 |
| | | | | 701/93 |
| 2017/0043848 | A1* | 2/2017 | Rigdon | G08G 3/02 |
| 2017/0316333 | A1* | 11/2017 | Levinson | G05D 1/0248 |
| 2018/0012082 | A1* | 1/2018 | Satazoda | G06K 9/00805 |

OTHER PUBLICATIONS

R. J. Wroblewski, "Performance of an Approximate, Multidimensional Range Index for Big Data," nt'l Conf. on Advances in Big Data Analytics (2015).

* cited by examiner

|  | Precision | Recall | F1 | Support |
|---|---|---|---|---|
| Fishing | 0.64 | 0.46 | 0.53 | 5723 |
| Passenger | 0.23 | 0.56 | 0.33 | 1025 |
| Pleasure | 0.38 | 0.65 | 0.48 | 5609 |
| Sailing | 0.48 | 0.29 | 0.36 | 3861 |
| Cargo/Tanker | 0.84 | 0.60 | 0.70 | 8515 |
| Average | 0.60 | 0.53 | 0.54 | 24733 |

|  | Precision | Recall | F1 | Support |
|---|---|---|---|---|
| Fishing | 0.86 | 0.92 | 0.89 | 633227 |
| Passenger | 0.84 | 0.76 | 0.80 | 89843 |
| Pleasure | 0.89 | 0.88 | 0.89 | 597394 |
| Sailing | 0.82 | 0.79 | 0.80 | 332779 |
| Cargo/Tanker | 0.93 | 0.91 | 0.92 | 770307 |
| Average | 0.88 | 0.88 | 0.88 | 2423550 |

|  | Precision | Recall | F1 | Support |
|---|---|---|---|---|
| Fishing | 0.47 | 0.59 | 0.53 | 3300 |
| Passenger | 0.55 | 0.58 | 0.57 | 3300 |
| Pleasure | 0.71 | 0.69 | 0.70 | 3300 |
| Sailing | 0.33 | 0.29 | 0.31 | 3300 |
| Cargo/Tanker | 0.50 | 0.44 | 0.47 | 3300 |
| Average | 0.51 | 0.52 | 0.51 | 16500 |

|  | Precision | Recall | F1 | Support |
|---|---|---|---|---|
| Fishing | 0.89 | 0.74 | 0.81 | 48002 |
| Passenger | 0.87 | 0.87 | 0.87 | 19837 |
| Sailing | 0.56 | 0.84 | 0.67 | 16455 |
| Cargo/Tanker | 0.87 | 0.86 | 0.87 | 31079 |
| Average | 0.84 | 0.81 | 0.82 | 115373 |

SYSTEM AND METHOD FOR MOTION ABSTRACTION, ACTIVITY IDENTIFICATION, AND VEHICLE CLASSIFICATION

FEDERALLY-SPONSORED RESEARCH AND DEVELOPMENT

The United States Government has ownership rights in the subject matter of the present disclosure. Licensing inquiries may be directed to the Office of Research and Technical Applications, Space and Naval Warfare Systems Center Pacific, Code 72120, San Diego, Calif. 92152. Phone: (619) 553-5118; email: ssc_pac_t2@navy.mil. Refer to Navy Case No. 109559.

BACKGROUND

Pattern-of-life studies of grey vessels by class, or even a specific ship, may be an important starting point for the detection of anomalies. These anomalies can range from the simple, such as a ship in an atypical location for its ship class/type, to the more complex comparisons of behaviors to normality.

Multidimensional indexing may be used as a method of collapsing a multidimensional vector into an ordered, invertible, one-dimensional value such that input vectors that are "close" in the multidimensional space will have indexes that are "close" in the one-dimensional index space. This may be achieved using space-filling curves such as the Morton or Z-Order curve. The nature of these curves is fractal. The caveat is that the closeness condition is generally satisfied over cascading power-of-2 regions. FIG. 1 is related art showing a two-dimensional example of the curve and index.

Understanding the peculiarities of this space-filling curve may allow for searches over cloud-based big data. Typically, these types of indexes are used for geolocation data but may be used in other contexts. A need exists for a method for behavior analysis through motion abstraction, as well as a technique to compress pattern-of-life data into a standard form; kinematic data may be used for behavioral analysis of vessels/vehicles, both for identification of activity and for vessel classification.

SUMMARY

The present disclosure describes a system and method for motion abstraction, activity identification, and vehicle classification. According to an illustrative embodiment, a method is provided for kinematic-data abstraction, activity identification, entity classification, and entity identification, wherein kinematic data is decomposed using an ontology describing motion, activities are decomposed using an ontology describing activities, and entity classes are decomposed using an ontology describing entity classes having unique-entity instances. The method includes: receiving the kinematic data via a communication component, wherein the kinematic data comprises sets of data each including an entity tag, a timestamp, and a position vector; sequentially processing the kinematic data via a controller, wherein the sequential processing utilizes the ontology describing motion, which includes allowed motion states for a domain of interest, and wherein the sequential processing provides sequences of motion states with metadata including motion details; processing the sequences of motion states, via a determining component, wherein the processing includes: identifying an activity of an entity utilizing the ontology describing activities, classifying an entity class utilizing the ontology describing entity classes, and identifying the entity utilizing archived motion-state sequences; and outputting results to a display showing motion-abstract patterns with relative distributions of the patterns ordered within an ontology and taxonomy based on the decomposed kinematic data.

BRIEF DESCRIPTION OF THE DRAWINGS

Features of illustrative embodiments will be best understood from the accompanying drawings, taken in conjunction with the accompanying description, in which similarly-referenced characters refer to similarly-referenced parts. The elements in the drawings may not be drawn to scale. Some elements and/or dimensions may be enlarged or minimized, as appropriate, to provide or reduce emphasis and/or further detail.

DETAILED DESCRIPTION OF VARIOUS EMBODIMENTS

Figure 1:
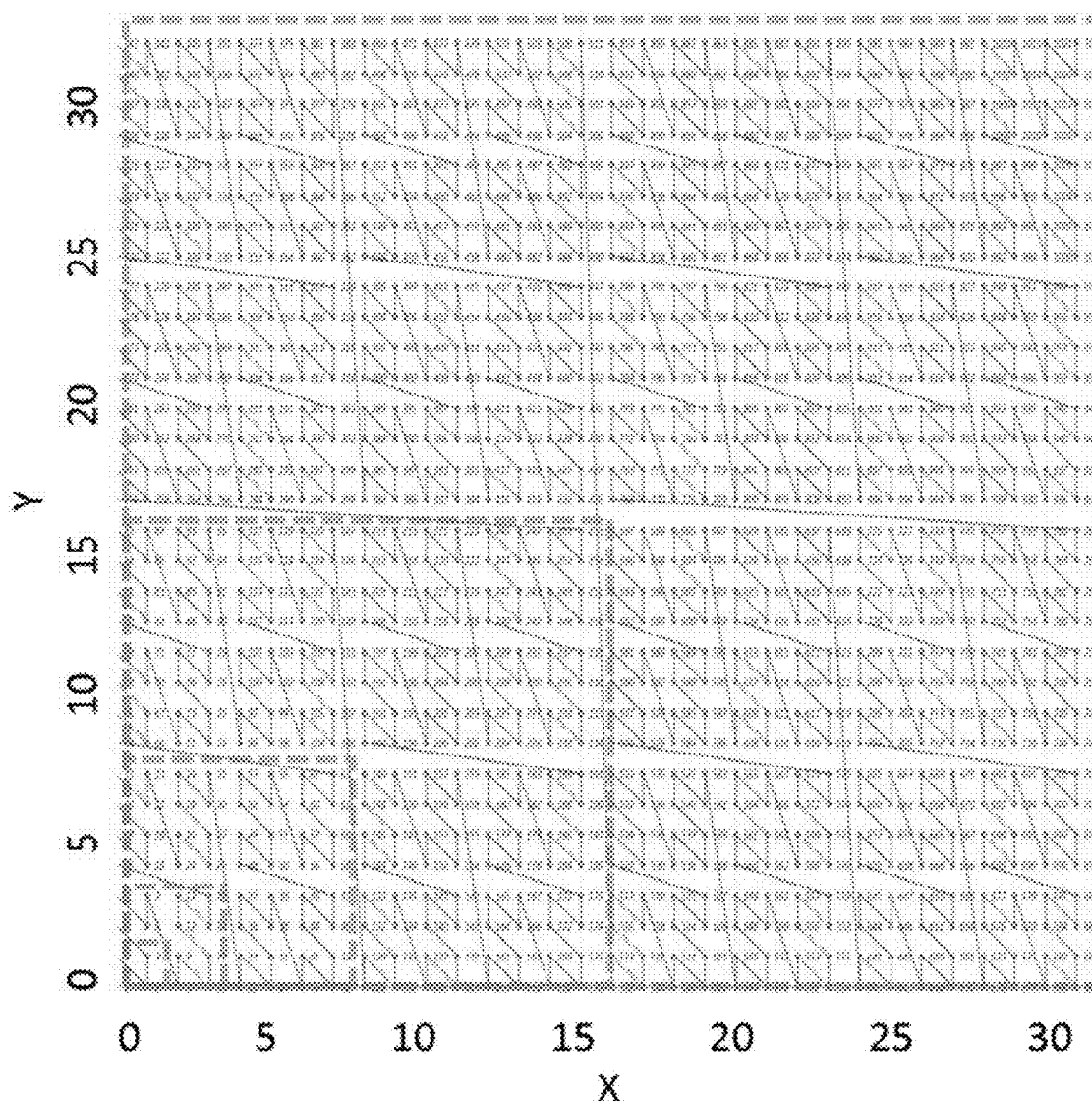
FIG. 1 is related art showing a two-dimensional example of the Morton Curve and multidimensional index.

References in the present disclosure to "one embodiment," "an embodiment," or similar phrases, mean that a particular element, feature, structure, or characteristic described in connection with the embodiments is included in at least one embodiment. The appearances of the phrases "in one embodiment," "in some embodiments," and "in other embodiments," or similar phrases, in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of "the," "a," "an," or similar language, are employed to describe elements and components of the embodiments herein; this is done merely for grammatical reasons and to conform to idiomatic English. This detailed description should be read to include one or at least one, and the singular also includes the plural unless it is clearly meant otherwise.

The embodiments disclosed herein describe a system and method for motion abstraction, activity identification, and vehicle classification that is suitable for, e.g., decomposing raw data and providing a standardized format of classification utilizing ontologies and their associated taxonomies.

State-space indexing may be considered an application of multidimensional indexing wherein three dimensions of space (for conformal dimensions free of wrapping issues), two dimensions of (surface) velocity, and one dimension of time are combined into a six-dimensional index. This six-dimensional index may be tested using data such as Automatic Identification System (AIS) data for maritime vessels. Entities moving with indexes close in this space over an extended period of time may be characterized as having movements that could be described as shadowing or convoying. Use of the multidimensional index may formally reduce a problem of $O(N^2)$ complexity to one of $O(N \log(N))$, wherein "O" refers to an "order of" and "N" represents a numerical value for data that is subject to processing; therefore, data that normally scales an "order of N-squared" may be reduced to data that scales an "order of N log(N)." In keeping with this example, if N=1000, the reduction in complexity would reduce $O(N^2)=1000^2$ computations to $O(N \log(N))=1000 \log(1000)$ computations, which is a reduction from 1,000,000 computations to 3,000 computations. The "over an extended period of time" condition can be exploited to further reduce the complexity to a mere $O(\log(N))$. This comes from noting that although the difference in the state-space index may vary as the individual entities cross power-of-two boundaries separately, any sequence of differences will tend to be at a minimum about half the time. This obviates the need for a formal search algorithm for state-space-close entities (e.g., $O(N \log(N))$) in favor of an approximate nearest-neighbor approach in one dimension. The $O(\log(N))$ determination comes from counting and thresholding the resulting pairs. Therefore, detection of shadowing and convoying movements by vessels may be more efficient than the process of decoding AIS messages, e.g., converting demodulated AIS RF signals from the NMEA-encoded form into human-readable data.

Supervised classification techniques in machine learning may be applied to both raw AIS positional data as well as transformed data obtained by applying a motion abstraction technique. A model-based approach may be adopted and encoded a priori with maritime kinematics domain knowledge in the construction of the motion-abstraction scheme. Class separability may be improved in the motion-abstraction feature space, thereby leading to improved classification performance over models trained directly on AIS positional data. Various supervised machine-learning techniques are discussed below.

K-Nearest Neighbors (k-NN) is a supervised algorithm wherein local aggregations for a query point (an unlabeled or otherwise out of sample point) are computed across the k-nearest in-sample points under an appropriate distance metric. In classification tasks, the k-nearest in-sample points vote for the label of the query point; in regression tasks, the sample mean of the k-nearest points may be used. Approximate Nearest Neighbor schemes, built upon the space-filling, multidimensional indexes, can retain performance while reducing the computational costs of prediction.

Decision tree classifiers may be trained using a machine learning library implementing a Classification and Regression Trees (CART) algorithm. Decision trees recursively partition the feature space such that following each split, samples sharing a common label are grouped together. At training time, optimal features that best partition the data may be selected using a measure of impurity such as the Gini score or information gain. A technique for decreasing the variance of decision trees is to aggregate multiple models and average their predictions. Random Forest is an approximate-Bayesian technique which uses bootstrap aggregation ("bagging") to reduce variance without increasing bias.

Recurrent Neural Networks (RNNs), unlike other models such as the multi-layer perceptron (MLP) whose input domain is defined over finite-dimensional vector spaces, are dynamic in time and operate on ordered sequences of vectors. This allows RNNs to explicitly represent and exploit temporal dependency structure in time-series data. RNNs maintain a hidden-state vector that is updated per-timestep subject to a parametric non-linear transform of the previous hidden state and current observation vector. RNNs may be trained using back-propagation through time, which can be interpreted as unrolling the network over the duration of a training sequence, such that its structure resembles that of MLP, and performing standard back-propagation using stochastic gradient descent (SGD) to optimize the network's parameters. In back-propagation through time, the magnitude of the gradient signal decreases with the depth of the network. This issue, is commonly termed the "vanishing gradients problem." The subject matter of the present disclosure adopts the Long Short Term Memory (LSTM) network, which adds additional machinery to update the hidden state vector and mitigates this issue.

Hyper-parameter optimization may be implemented to find optimal hyper-parameters for the particular learning algorithm. These can include the number of nodes, the number of hidden layers, constraints, as well as the particular node-linking scheme. This type of tuning may only need to be computed a minimal number of times initially, and most of the performance gains may be due to a few hyper-parameters. For example, with the LSTM, the learning rate and the network size may affect the performance gains more than batching and momentum.

Figure 2:
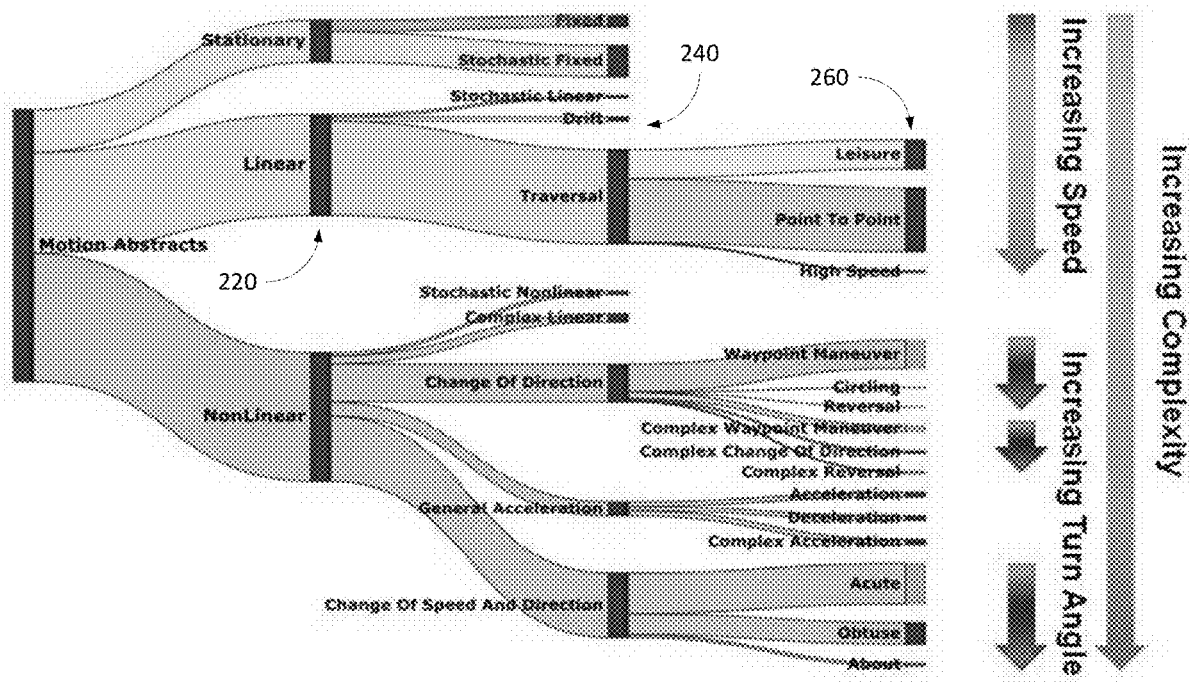
FIG. 2 is an example of a motion ontology with a taxonomy showing relative distributions of motion abstracts for raw data.

Motion abstraction pertains to the process of separating out the essence from the specifics of the motion, e.g., time and position, and may be used as a technique/method for behavioral analysis, as well as to compress pattern-of-life data into a standard form. The structure of the motion, such as the path shape or sequences of motion abstracts, may carry important characterizing information that can be translated in position, direction, and time. FIG. 2 shows an example of a motion ontology that may be created for the motion abstraction and may include three categories of motion (at region 220) such as Stationary, Linear, and Nonlinear. Motion may be further categorized by speed, speed changes, and direction changes. For example, Linear motion may be further subdivided (at region 240) into Stochastic Linear, Drift, and Traversal. Each of these subdivisions may correspond to increasing speeds. The first (Stochastic Linear) may essentially be a random walk with a general linear trend. The second (Drift) may correspond with typical sea currents. The third (Traversal) may correspond to deliberate progress from one point to another and may be further split into subdivisions (at region 260) for Leisure, Point-to-Point, and High Speed. While the particular thresholding parameters shown may be specialized for a given domain (e.g., maritime), the general principles of the motion-abstraction process can be extended to other domains (e.g., ground, aerial, etc.).

Motion-Abstraction taxonomy has a plurality of terms (as shown in FIG. 2). Note that in FIG. 2 the thickness of the lines indicates the relative number of motion abstracts for each class as calculated from input data (e.g., AIS data). The term "Complex" (as used in FIG. 2) is to express situations where the intermediate building blocks of the abstract show more complexity than the final result. For example, "Complex Linear" indicates a collection of nonlinear pieces that nevertheless gives an output speed and direction substantially equal to the input speed and direction but may be shifted port or starboard (in a maritime domain) of the original path direction.

Figure 3:
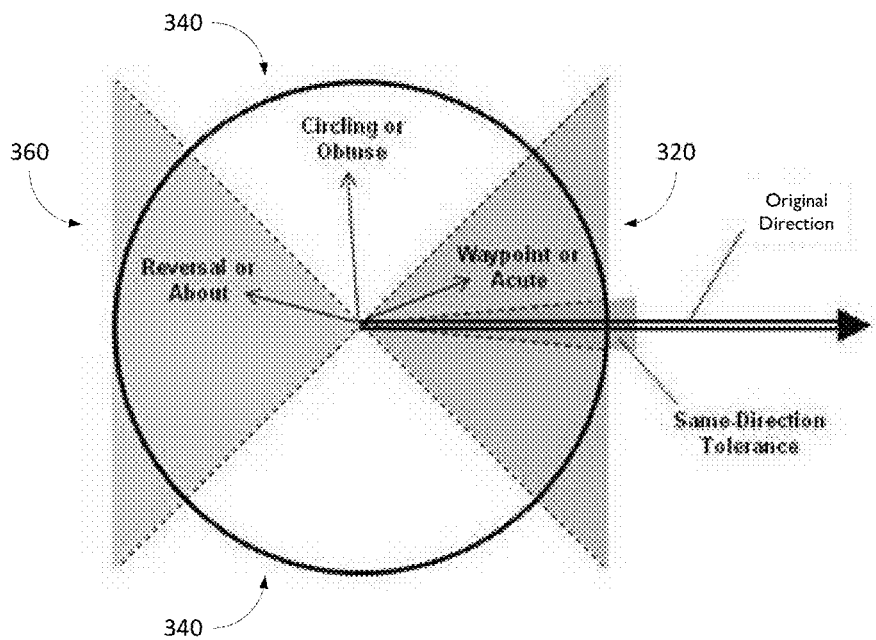
FIG. 3 is a depiction of a discriminator for the taxonomy of FIG. 2 with terms pertaining to "Change Of Direction."

Another discriminator in the taxonomy may pertain to the term "Change Of Direction" (as used in FIG. 2). A general depiction of the terms pertaining to this discriminator is shown in FIG. 3. "Waypoint" or "acute" may be used for turn angles within ±45° of the original direction (see region 320), "circling" or "obtuse" may be used for angles ±(45° to 135°) from the original direction (see regions 340), and "reversal or "about" may be used for angles greater than ±135° from the original direction (see region 360).

A dead-reckoning filter may be applied before the motion-abstraction process to minimize spurious "instantaneous" sampling errors that may occur due to a large sampling rate (in some embodiments the sampling rate of data, such as AIS data, may be about 5 minutes and include data of a given size, e.g., gigabytes, terabytes, etc., depending on the domain of interest). Speed and direction tolerances may be set to a percentage (e.g., 10%) for determining changes from the original speed and direction. For direction, this may translate to an angle tolerance of $\tan^{-1}(0.1) \cong 5.7°$ (see "Same-Direction Tolerance" as shown in FIG. 3).

A plurality of data points can be compressed into one motion abstract. Using linear motion, many points can be summarized simply with a start position, end position, and duration (or a start position and time, velocity (speed and direction), and duration). Nonlinear motion can be summarized similarly with initial and final states having time, position, and velocity. The precision and compression level of these motion states may depend on the tolerances allowed for determining the state, as well as any accelerations, acceleration rates, or higher-order rates that may be estimated.

Using the sampling rate example above, the five-minute sampling rate may correspond to about a 50-to-1 compression, while the motion-abstraction process multiplies this by another factor of 6-to-10, thereby yielding compression of about two or three orders of magnitude. The initial sampling rate is effectively a temporal tolerance that can be adjusted for the level of precision desired. This can be of considerable significance for pattern-of-life studies using multiyear data storage. AIS data may be chosen as input data that has such multiyear data storage because of its high availability over large portions of the globe and over long periods of time. An AIS database may include many terabytes or even petabytes of data, and the ability to abstract the motion states and sequences and save them at a thousandth of the AIS database size may make pattern search, matching, and retrieval more efficient and practical.

An example of an analogous concept would include vector graphics, which can be compressed into relatively small data files and yet be scalable to any desired size. The resulting graphic would be smooth at any zoom factor. Lines are stored with initial and final points, while curves are comprised, for example, of piecewise-smooth splines. The compression level is determined by the desired precision of the curve and the expected zoom factors.

Figure 4:
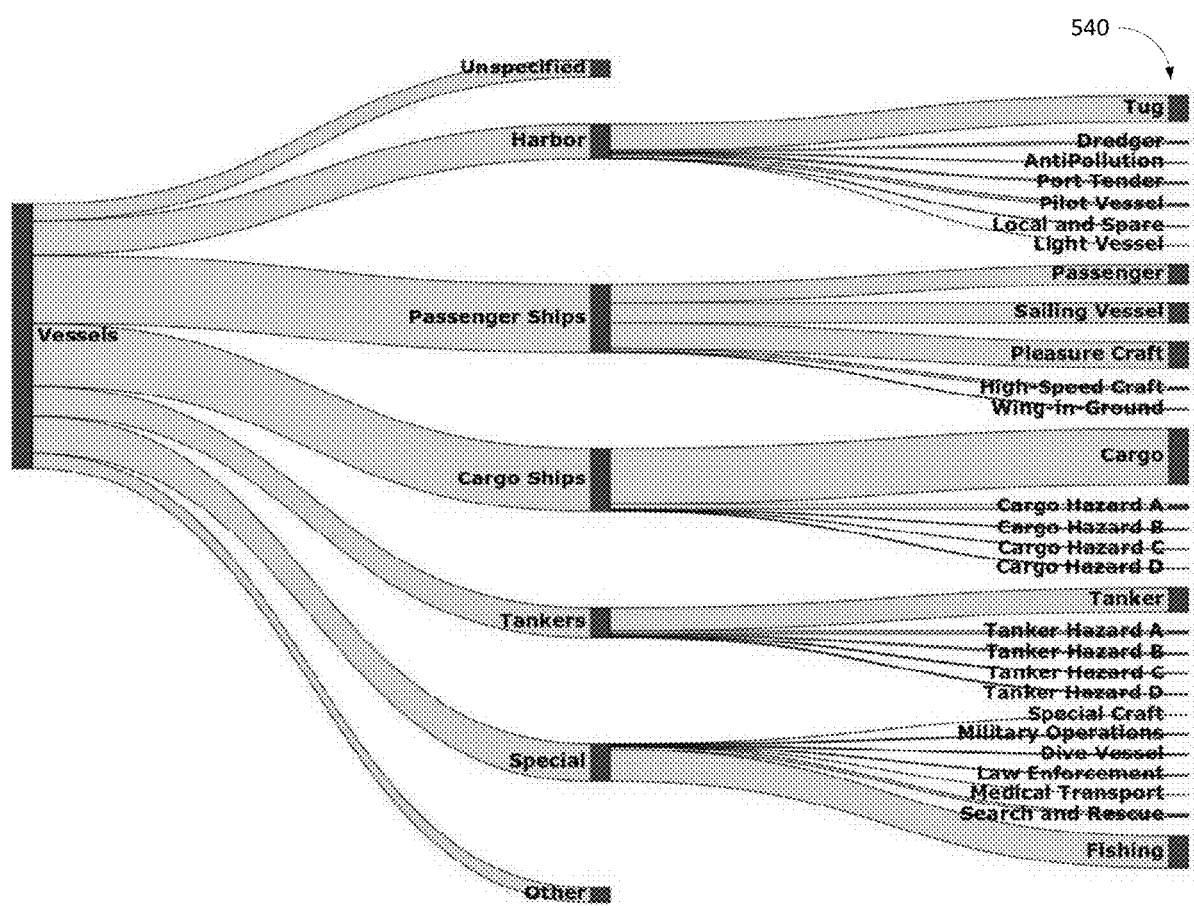
FIG. 4 is an example of an ontology describing entity classes having unique-entity instances with a taxonomy utilizing AIS ship types.

Continuing with the AIS data example, AIS data may include static data such as ship name and type in addition to the dynamic reports of position and velocity. The ship types may be chosen from the AIS-standard of 30 values plus an "unspecified" (i.e., not filled) field. This static data may be arranged into a taxonomy of (AIS) ship types. FIG. 4 shows a taxonomy in an ontology describing entity classes having unique-entity instances (e.g., AIS ship types). The sizes of the lines reflect the relative population of each class/type. In this example, it can be seen that seven types dominate (see region 540): tugs, passenger vessels, sailing vessels, pleasure craft, tankers, cargo vessels, and fishing vessels.

Figure 5A:
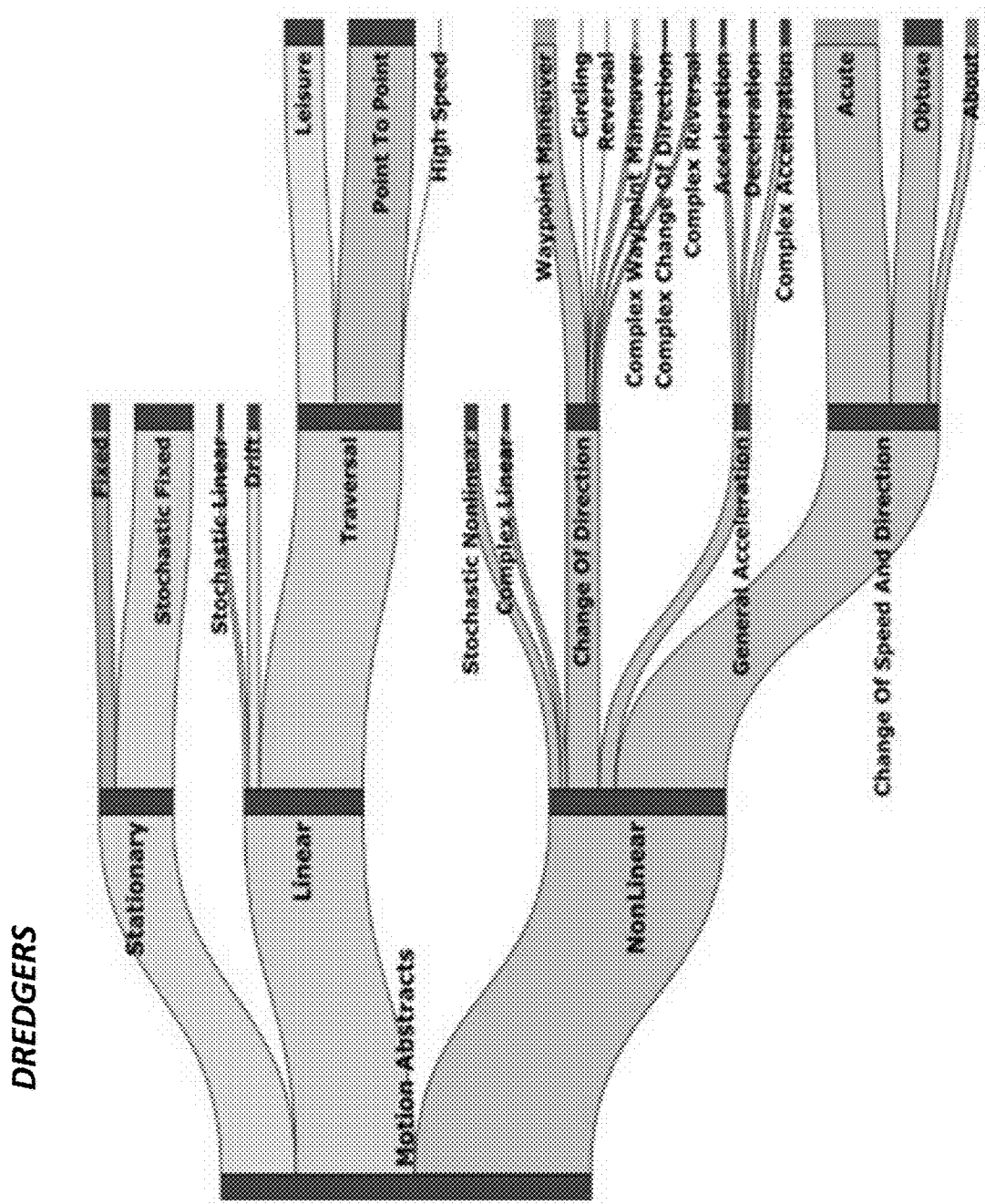
FIGS. 5A-5I show relative distributions of motion abstracts by a number of entities/ship classes.
Figure 5B:
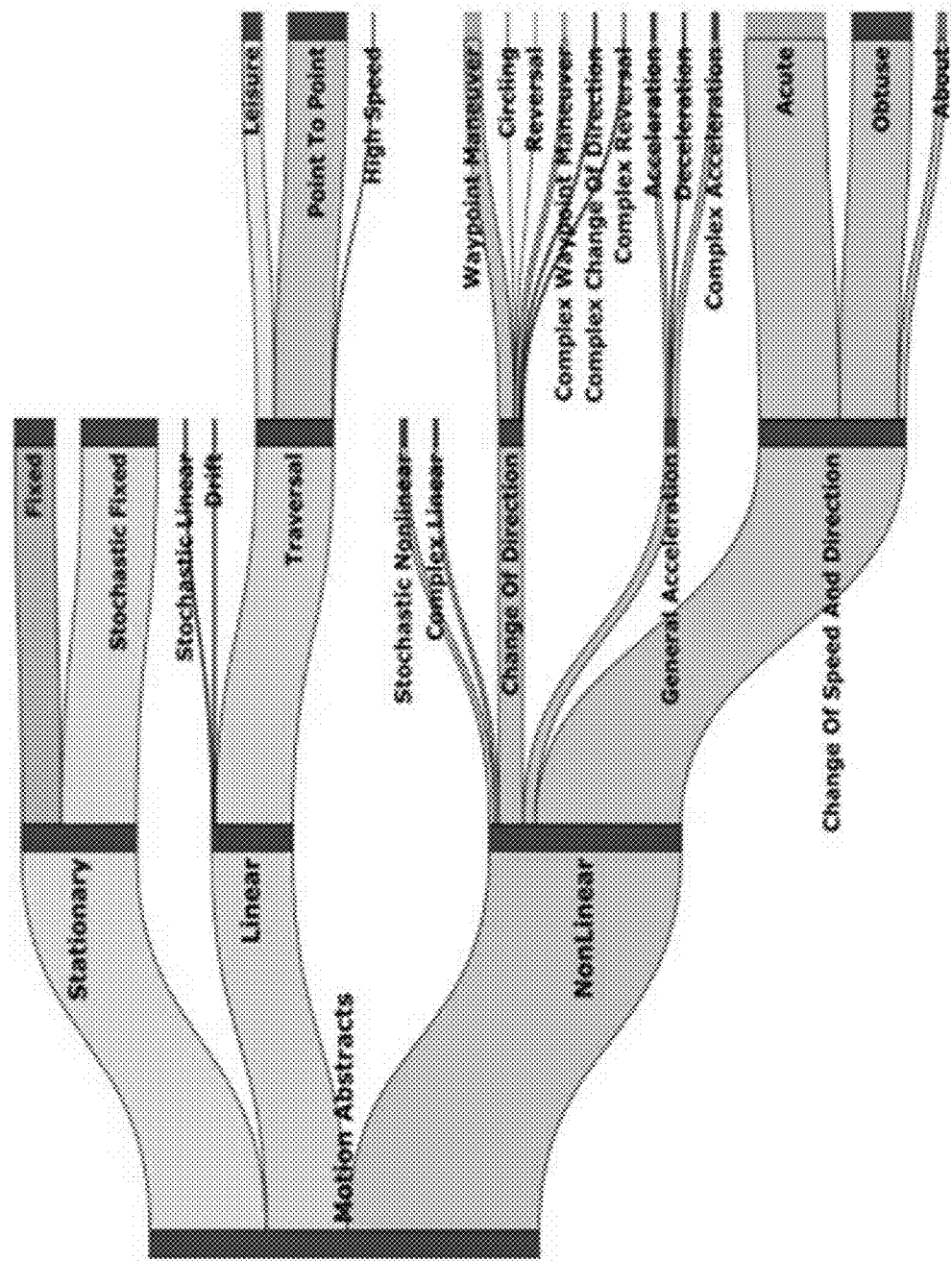
Figure 5C:
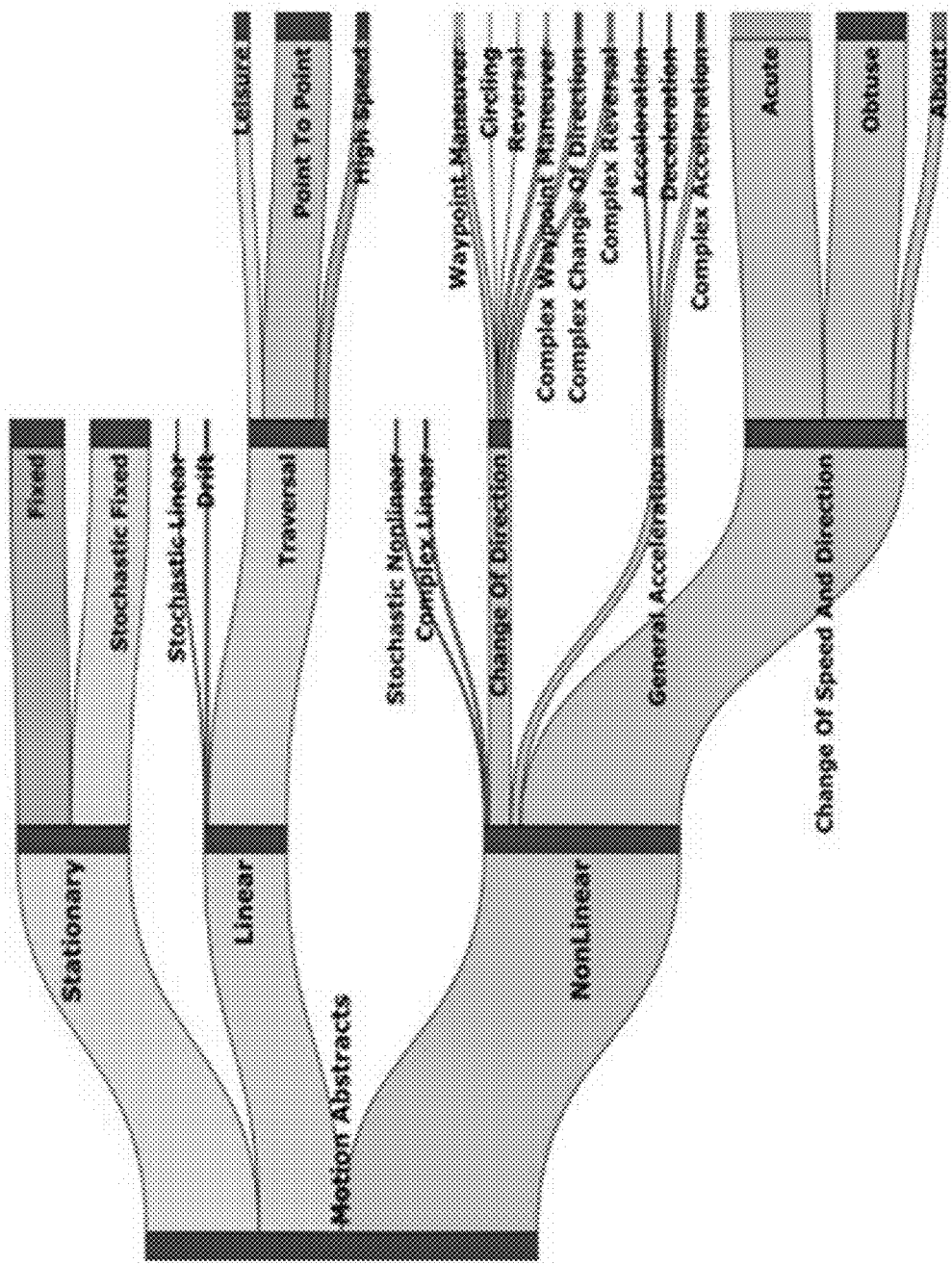
Figure 5D:
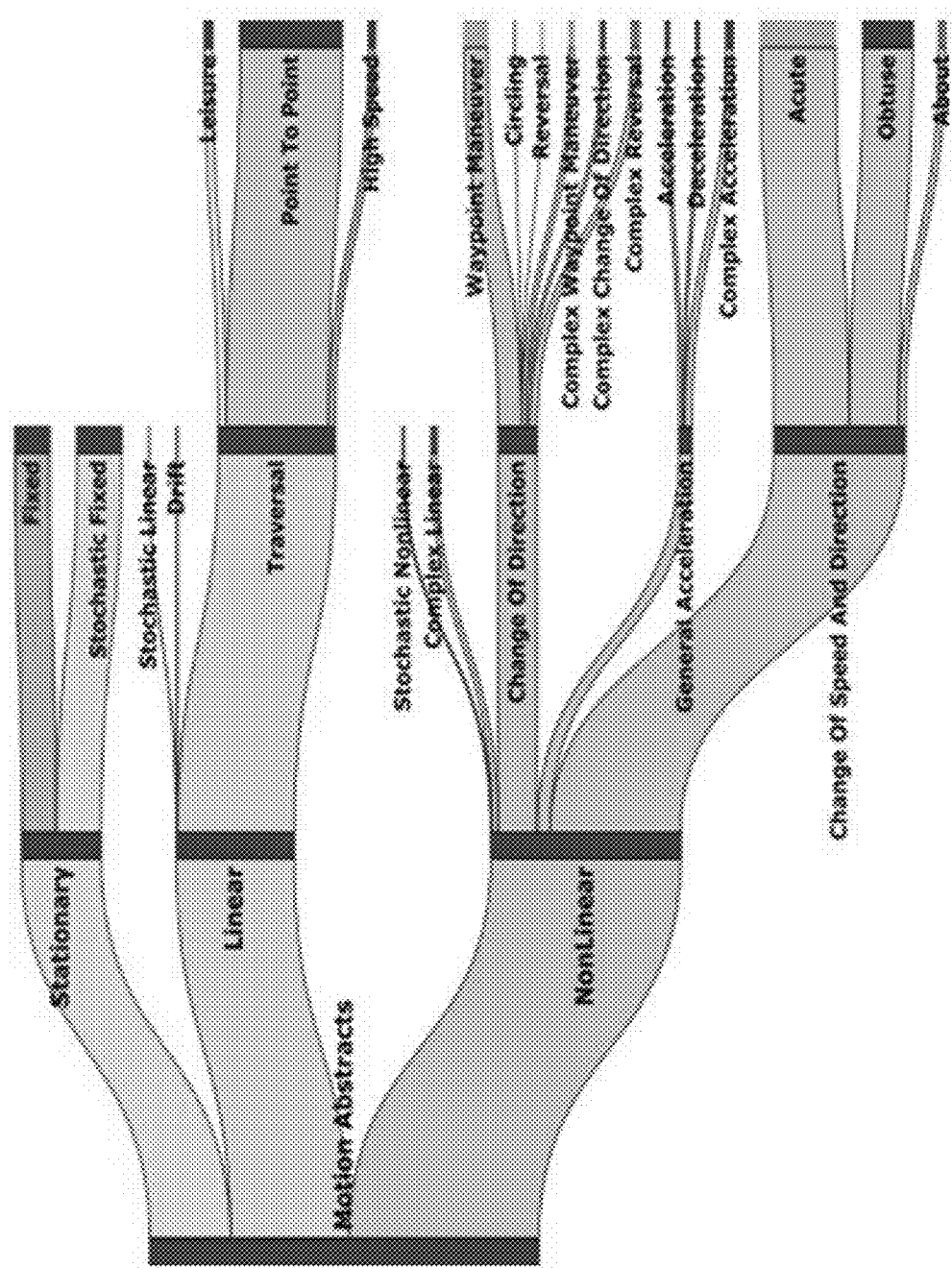
Figure 5E:
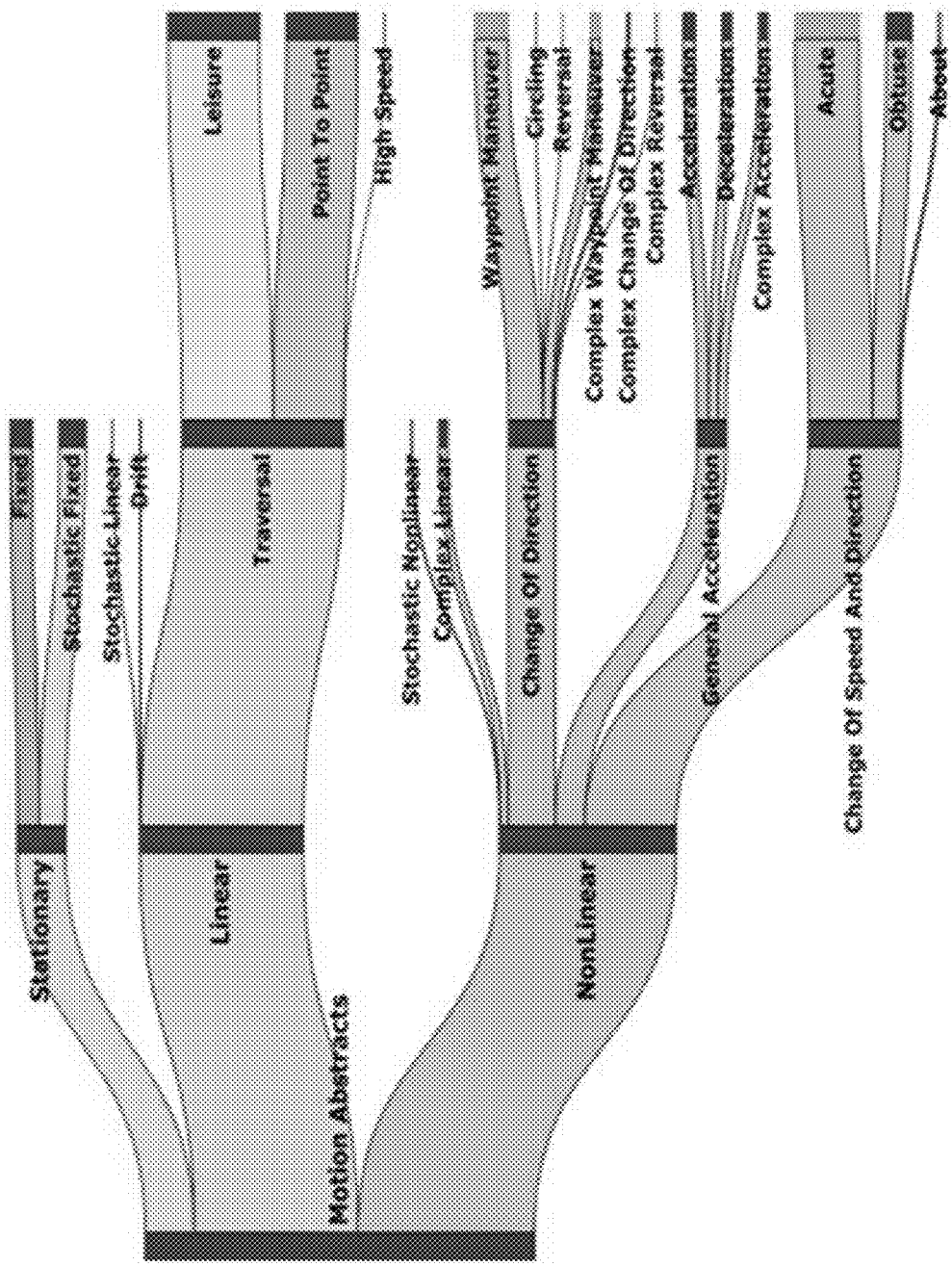
Figure 5F:
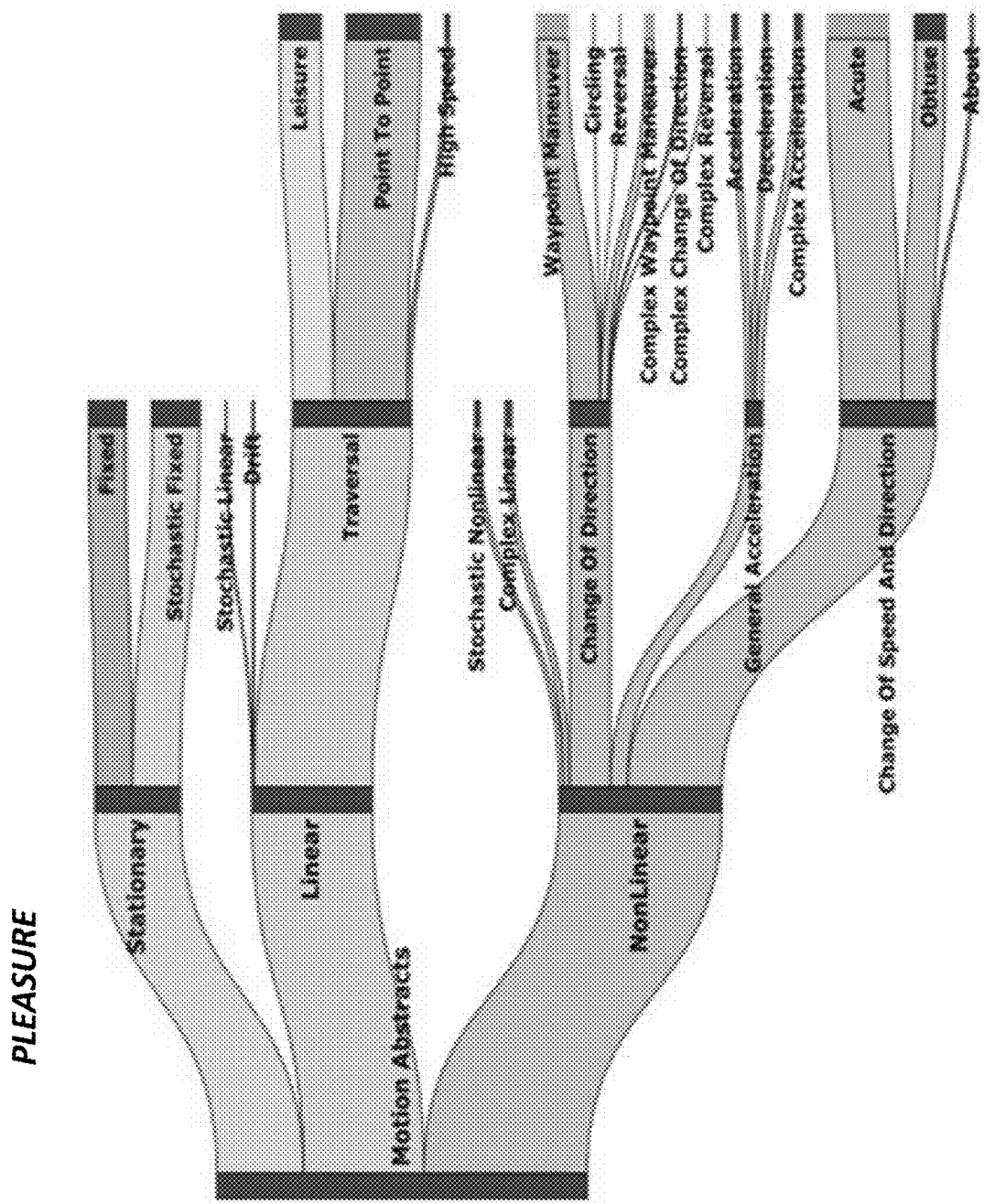
Figure 5G:
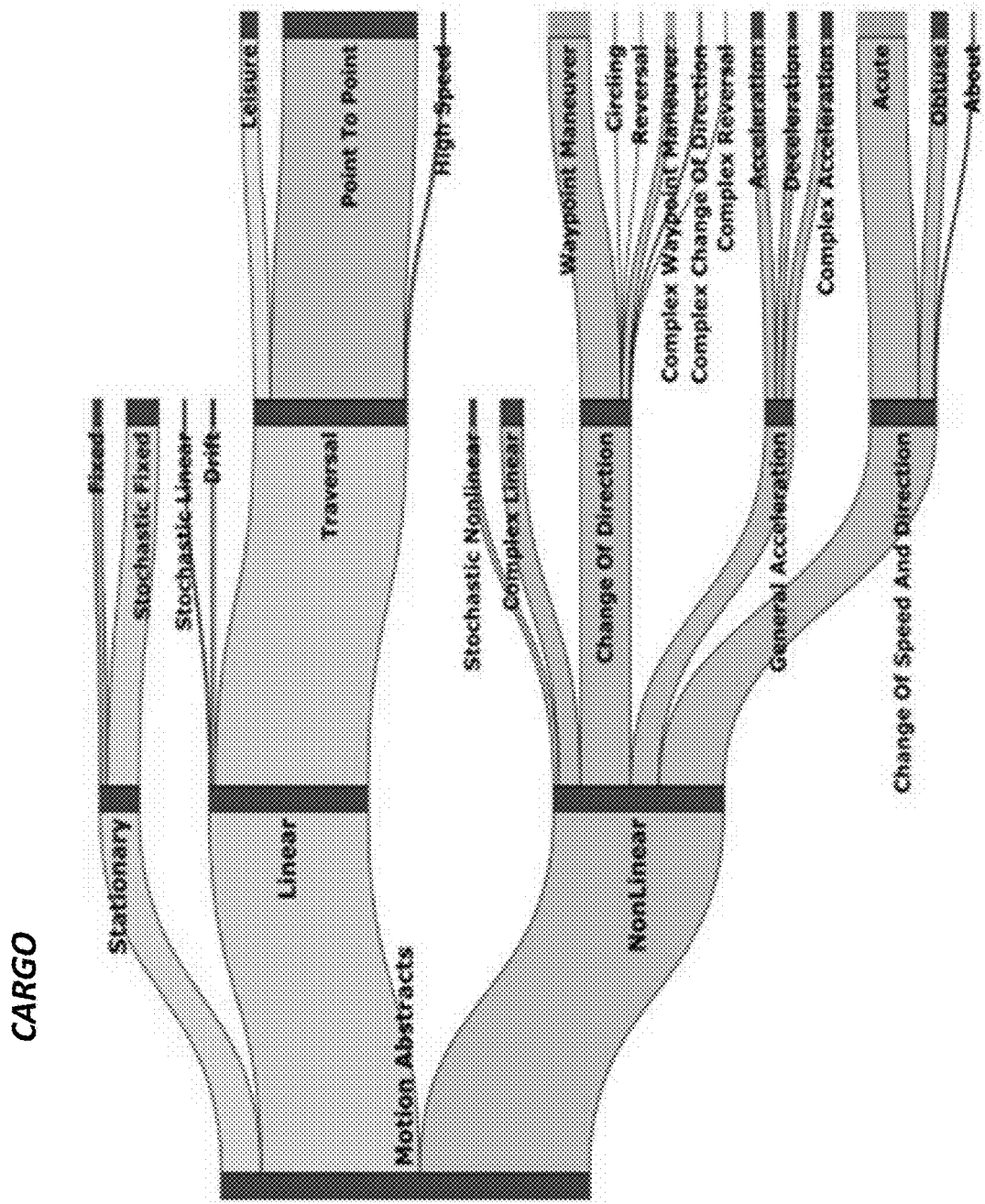
Figure 5H:
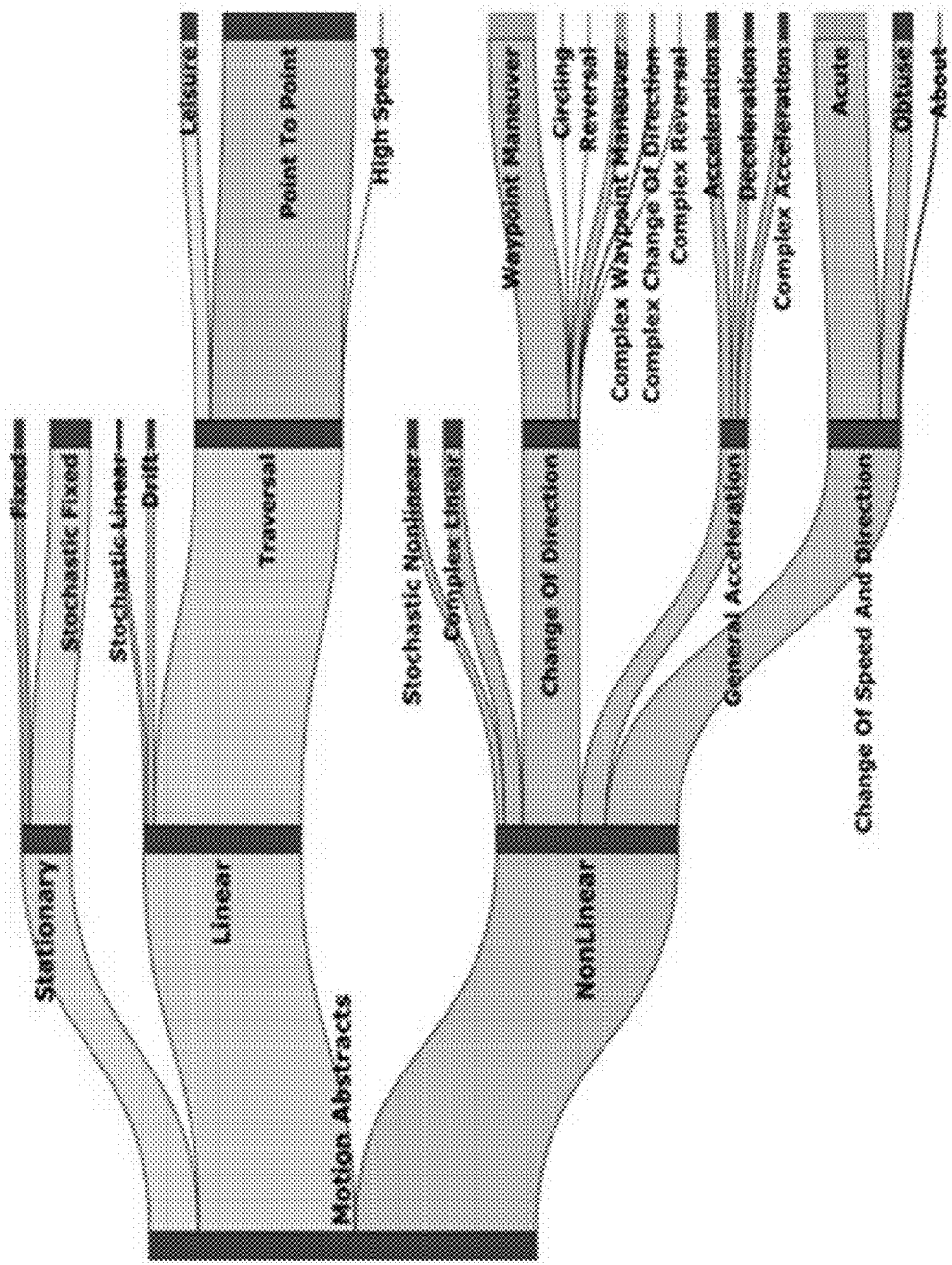
Figure 5I:
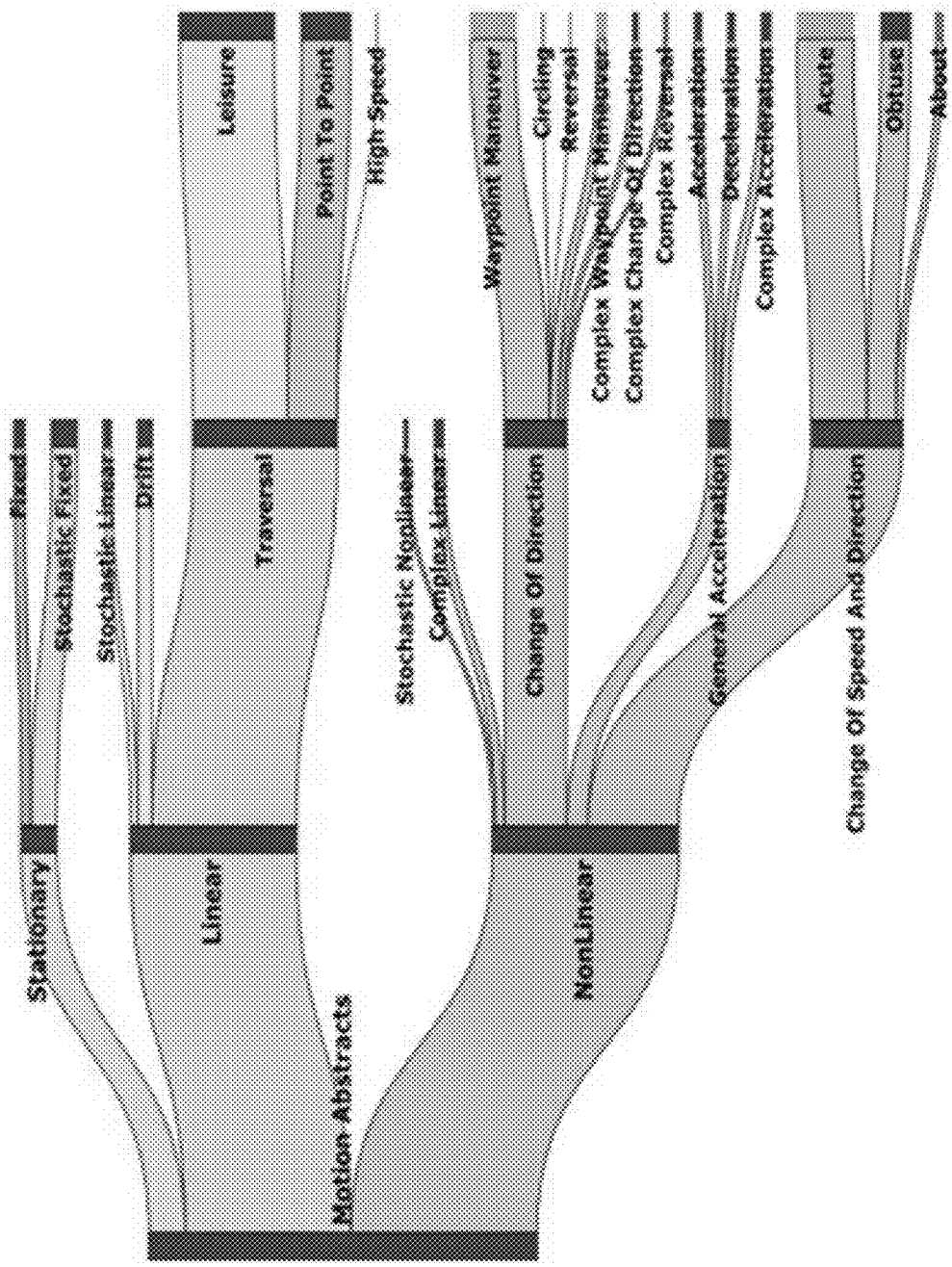
Figure 6A:
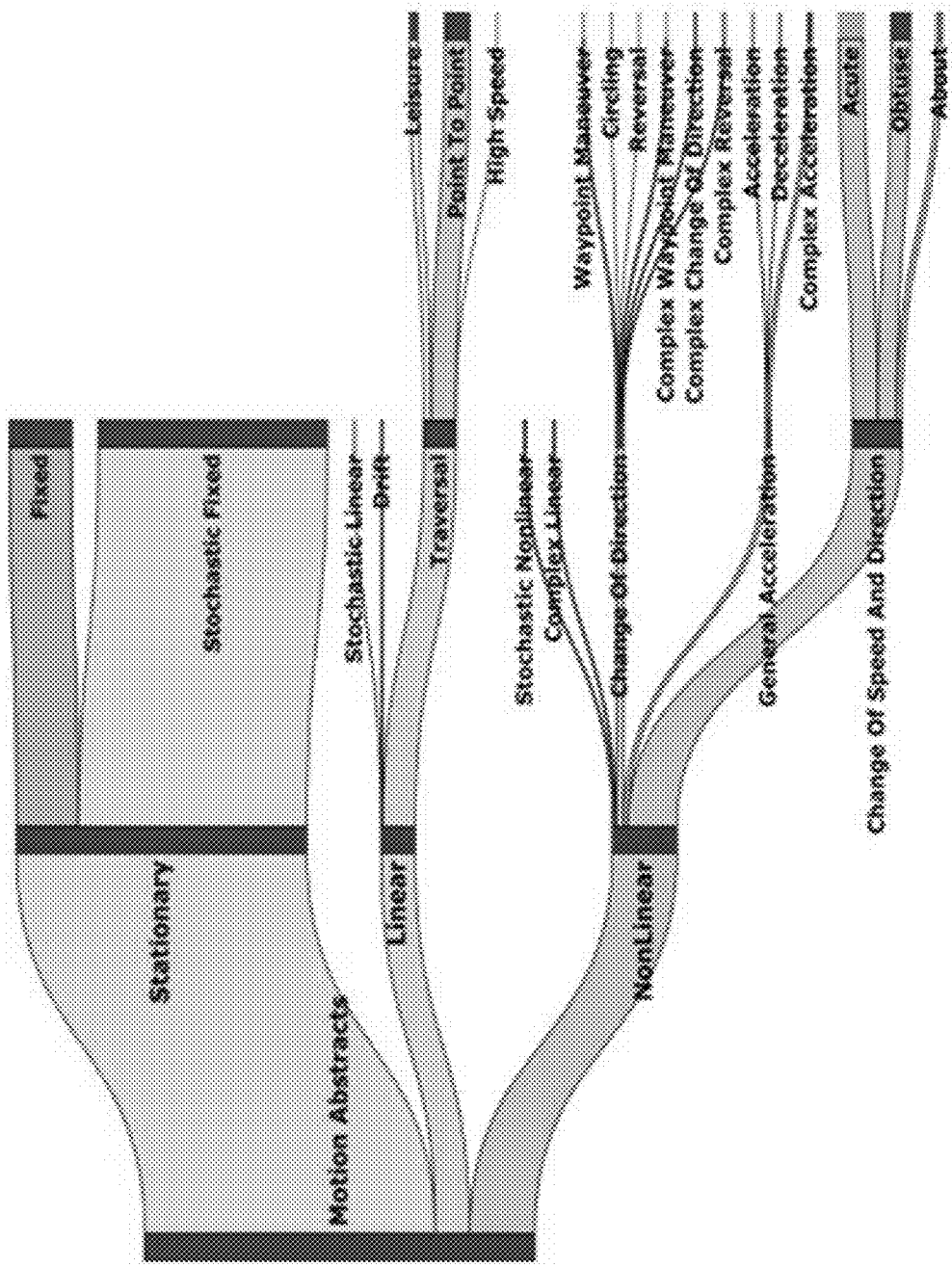
FIGS. 6A-6I show the motion abstracts of FIGS. 5A-5I with a discriminator for time spent by an entity in a particular motion state.
Figure 6B:
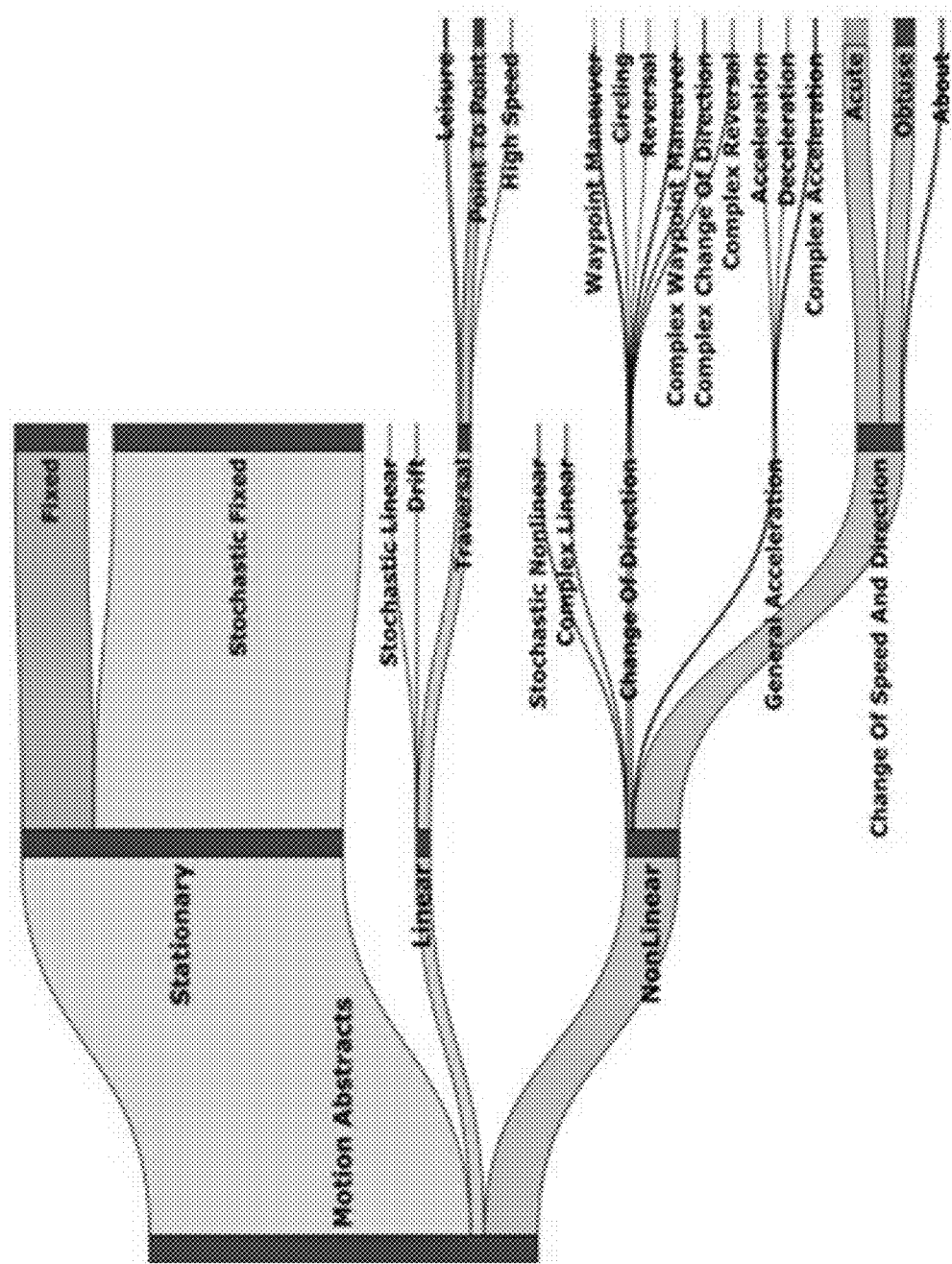
Figure 6C:
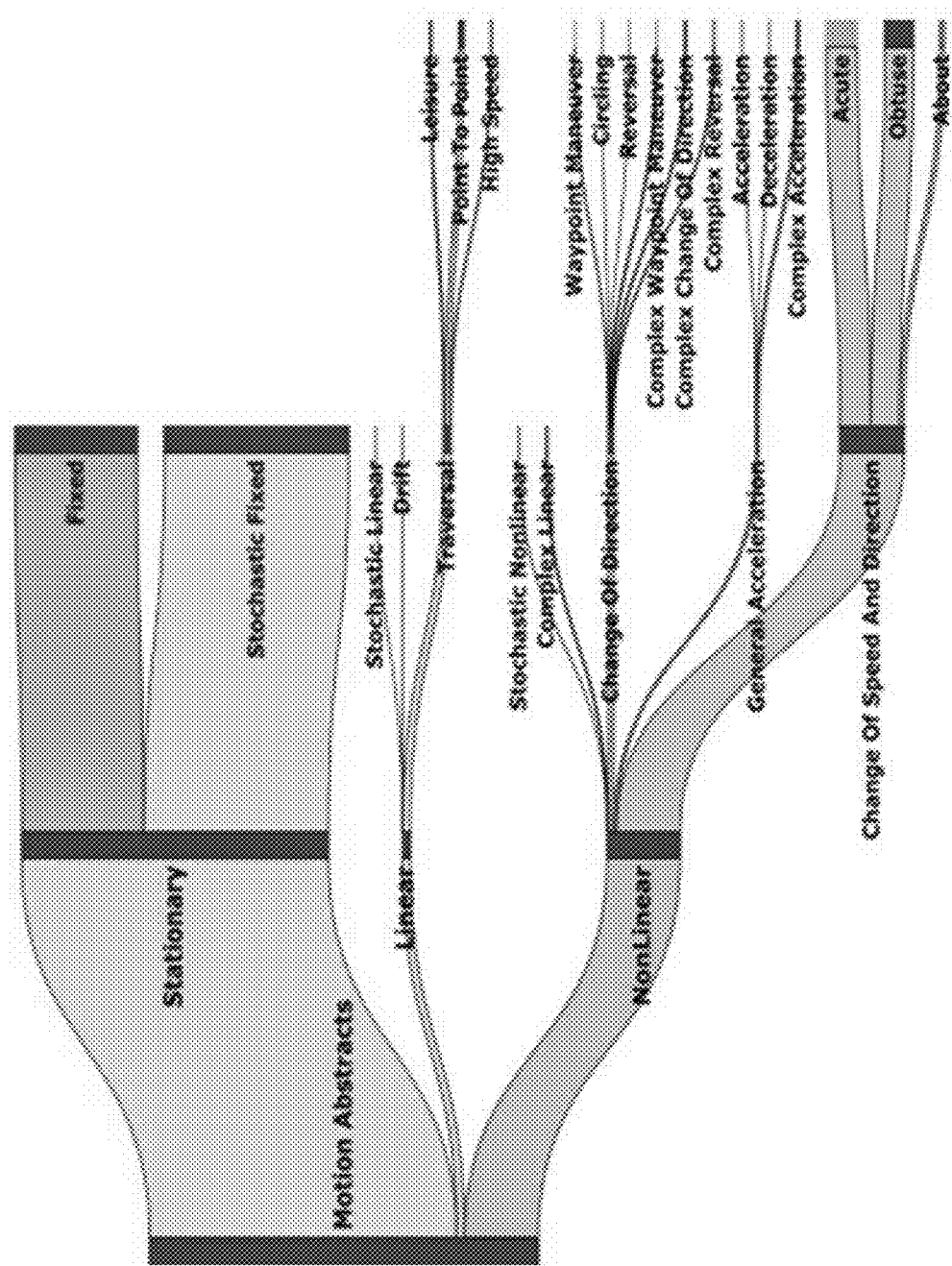
Figure 6D:
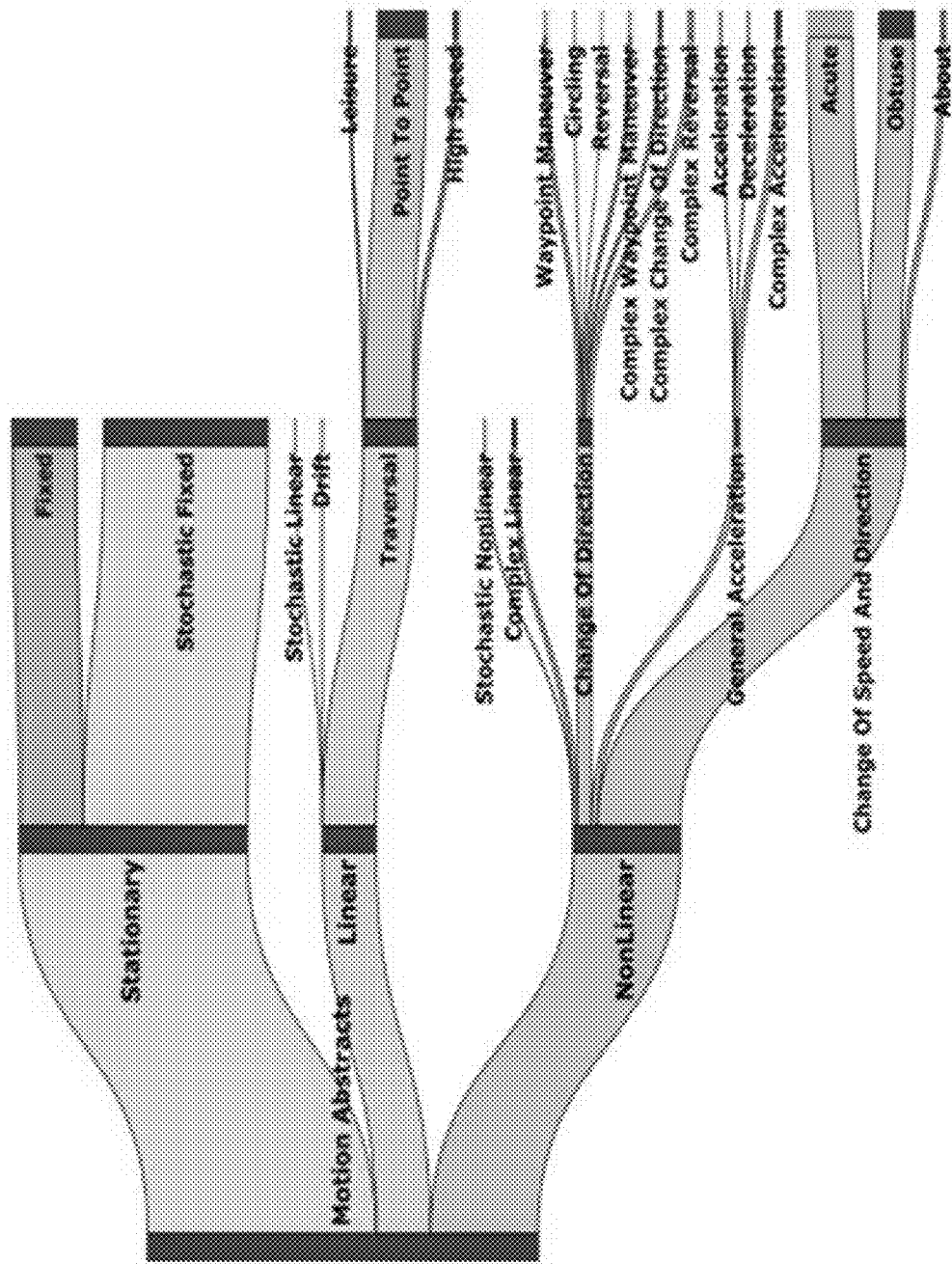
Figure 6E:
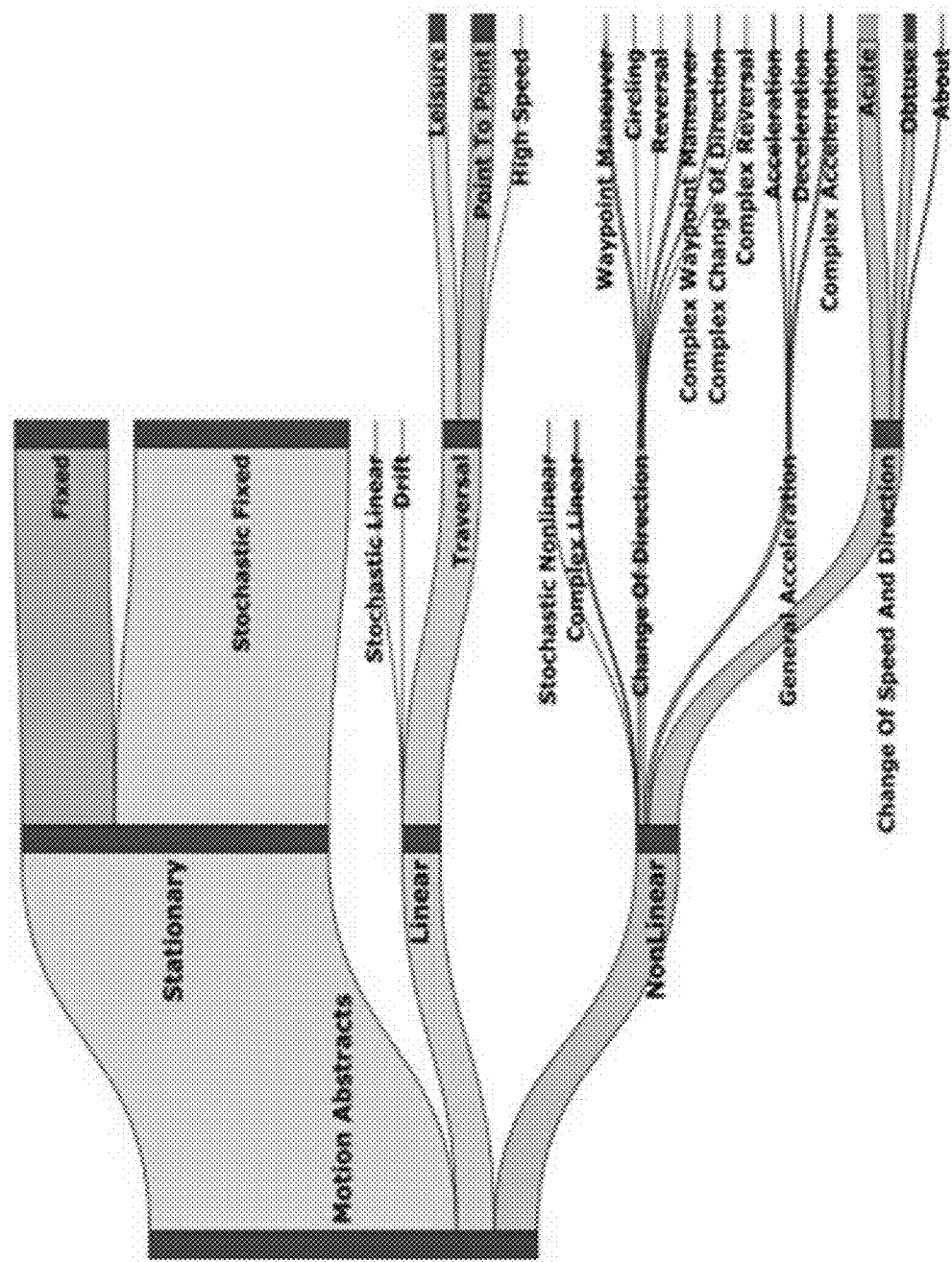
Figure 6F:
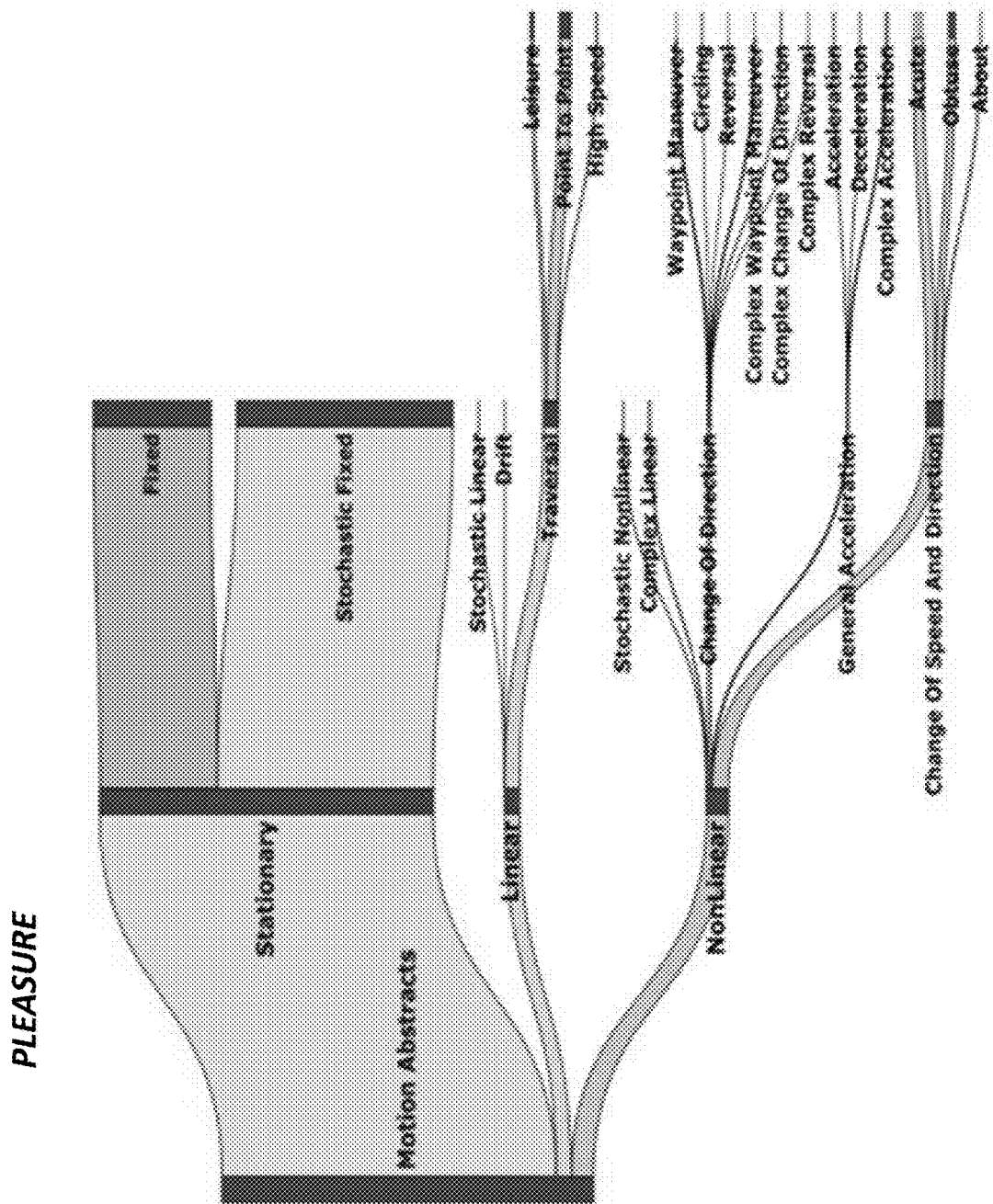
Figure 6G:
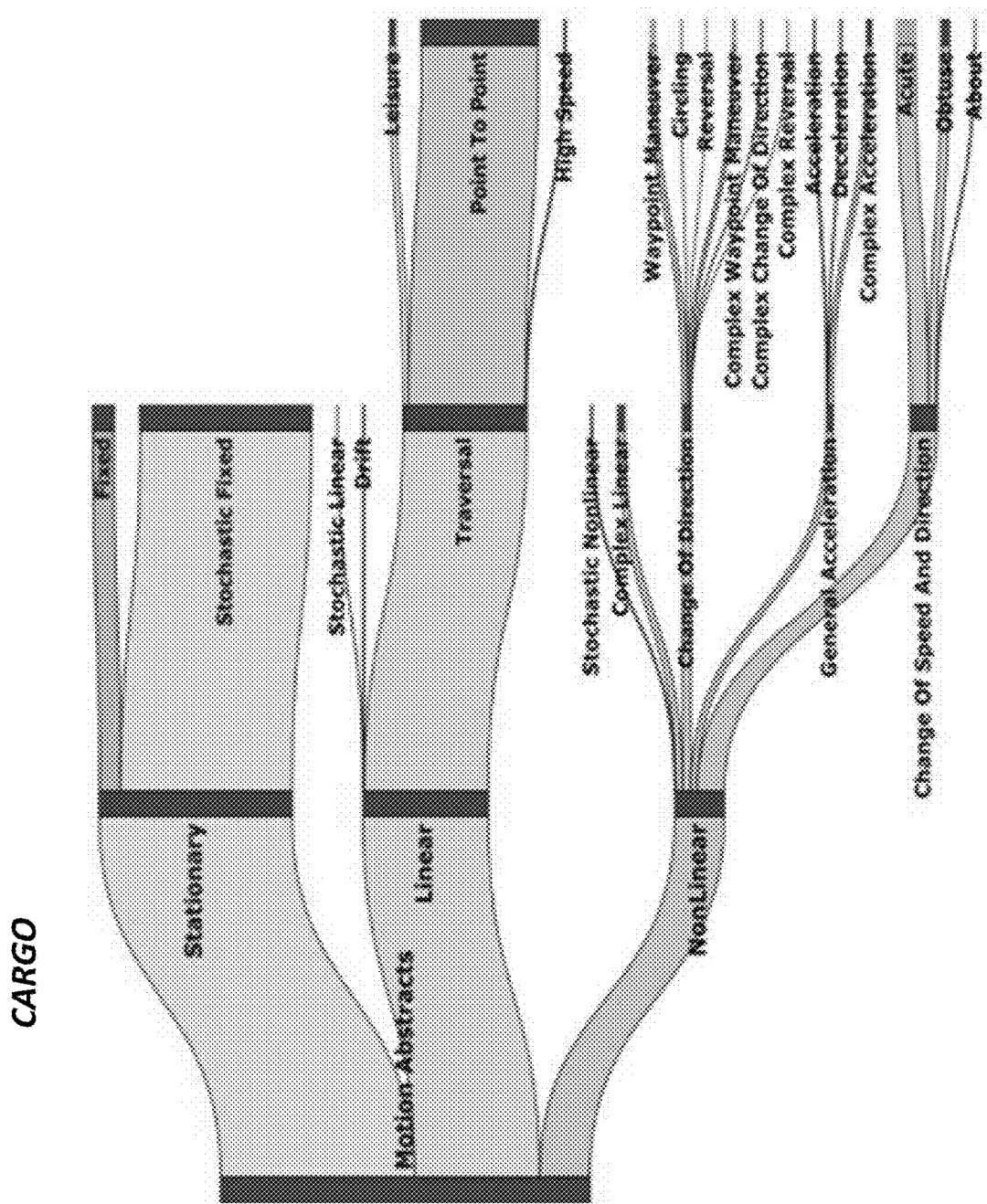
Figure 6H:
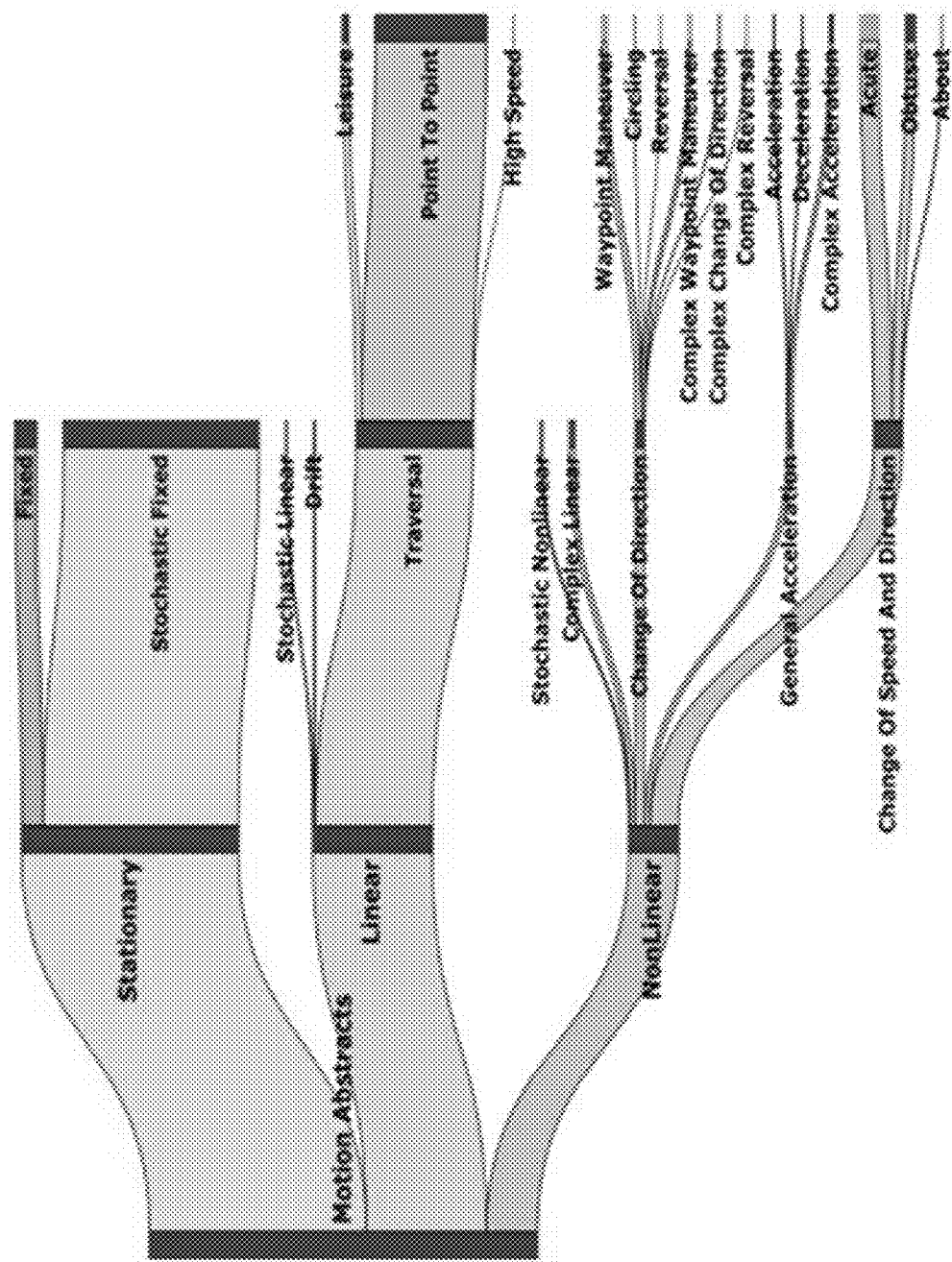
Figure 6I:
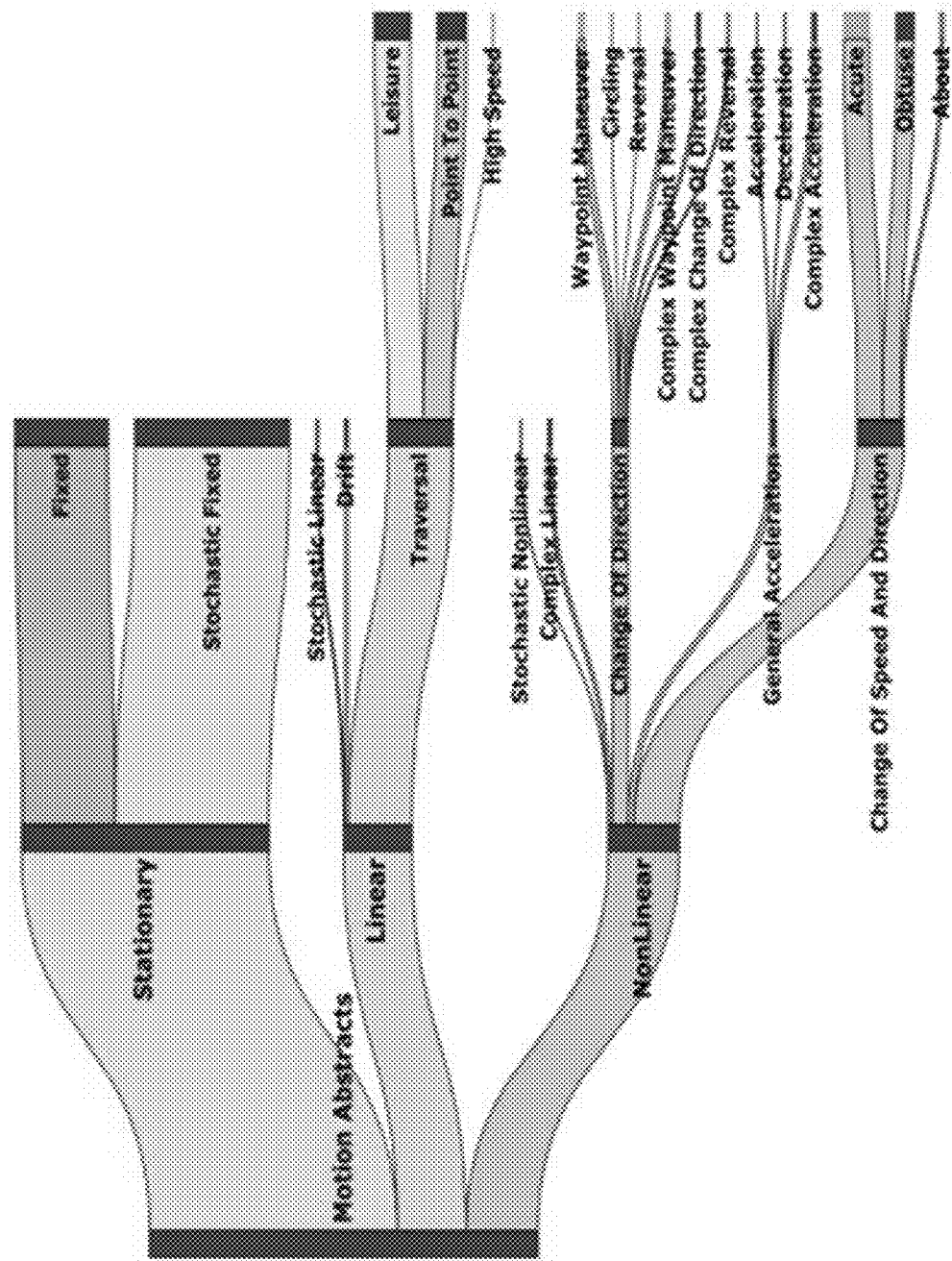

Related to the calculated motion abstracts shown in the FIG. 2 example, relative distributions of the abstracts by a number of ship classes is shown in FIGS. 5A-5I. In particular, three harbor vessel classes (dredgers, tenders, and pilot) are shown in FIGS. 5A-5C; three in-between vessel classes (passenger, sailing, and pleasure) are shown in FIGS. 5D-5F; and three deep-sea vessel classes (cargo, tanker, and fishing) are shown in FIGS. 5G-5I. The depicted motion abstracts by ship class may appear similar, but important nuances exist between the various classes. The relative populations of stationary abstracts decreases when moving from harbor vessel classes to deep-sea vessel classes. Correspondingly, the populations of the linear abstracts increase and nonlinear abstracts decrease.

There are also differences of note within each class. For example, dredgers may have higher populations in the slower linear abstracts, while pilots have a higher population of high-speed linear motions. Similar speed differences can be seen within the class that includes passenger, sailing, and pleasure vessels, as well as the class that includes cargo, tanker, and fishing vessels.

As shown in FIGS. 5A-5I, the motion abstracts do not have any particular temporal constraints and may have a variety of durations. Therefore, another potential discriminator between vessel classes may be implemented by considering the total time each vessel type spends in a particular motion state. FIGS. 6A-6I show the motion abstracts with the aforementioned discriminator. The relative time in each motion state is shown as the thickness of the connectors/branches.

FIGS. 6A-6I shows differences between the classes and within particular classes. For example, the motion abstract shows that for the stationary states the fishing vessels spend more time in a fixed state than other deep-sea vessels in the same class, as well as more time in nonlinear motion and less time in linear motion. These differing distributions of motion states by count and duration over vessel class may provide some differentiation via Likelihood methods.

Figure 7:
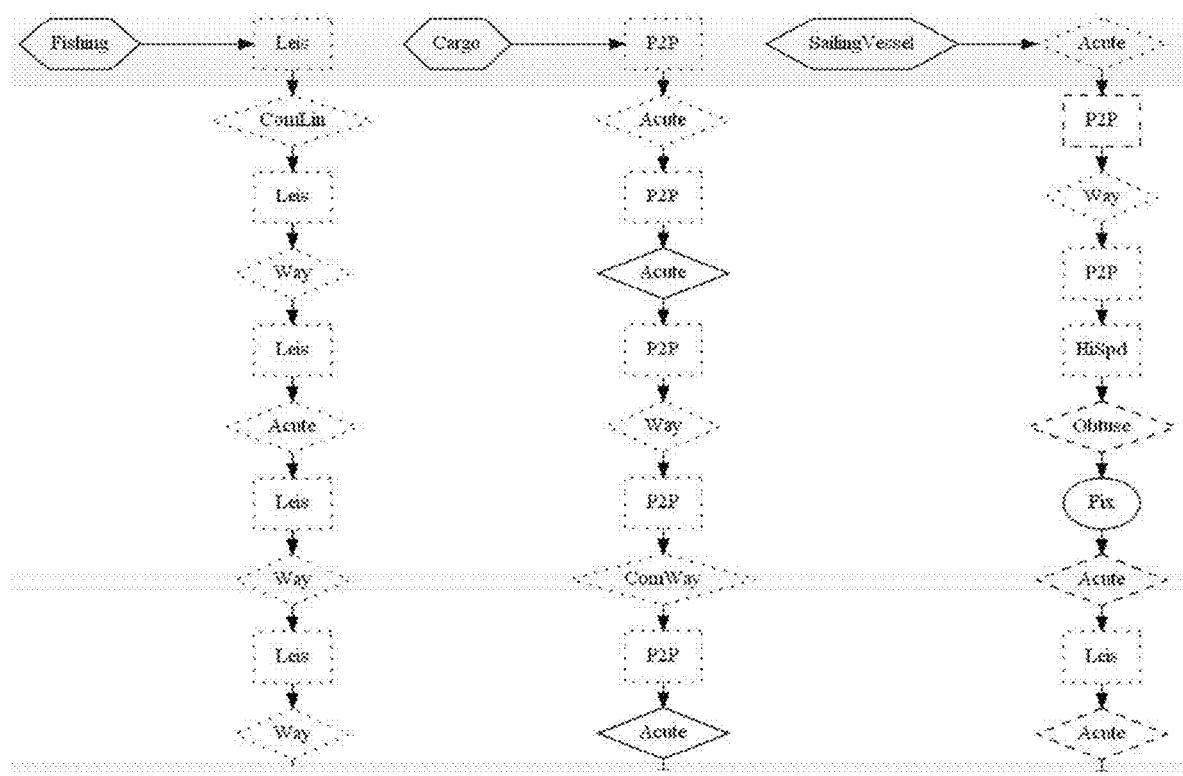
FIG. 7 shows examples of motion abstract sequences in accordance with the subject matter of the present disclosure.

FIG. 7 shows examples of motion-abstract sequences. Stationary classes are designated with ellipses, linear classes with rectangles, and nonlinear classes with diamonds. The line styles of the borders indicate highly quantized durations of the states. In this example, the fishing vessel is executing a series of relatively slow, alternating linear/nonlinear states. Meanwhile, the cargo vessel is proceeding along at speed with some course corrections. The sailing vessel has a variety of motions including at-speed, course corrections, turnabouts, and high-speed maneuvers. Generally, no pattern dominates any of the ship classes; however, there are classes of patterns that dominate for the differing ship types, as well as activity classes. Machine-learning techniques are useful for the combinatorics of these classification issues.

AIS data may be used for large amounts of data pertaining to time and location. But other types of data, such as tracks, are amenable to the subject matter of the present disclosure. Track data may refer to the output of trackers, which take position/time data, such as from a radar, and associate one point with another point to form a track. The individual position/time data may not, in general, be tagged with an entity tag/identification either specific to a particular entity or relative as to a previous position point, but assigning at least a relative entity tag is the task of the tracker. Velocity can then be inferred from the track. On the other hand, AIS data may generally be tagged with a specific unique entity tag and have embedded position and velocity data; AIS data may be externally tagged with the time that an RF transmission was collected.

Figure 14:
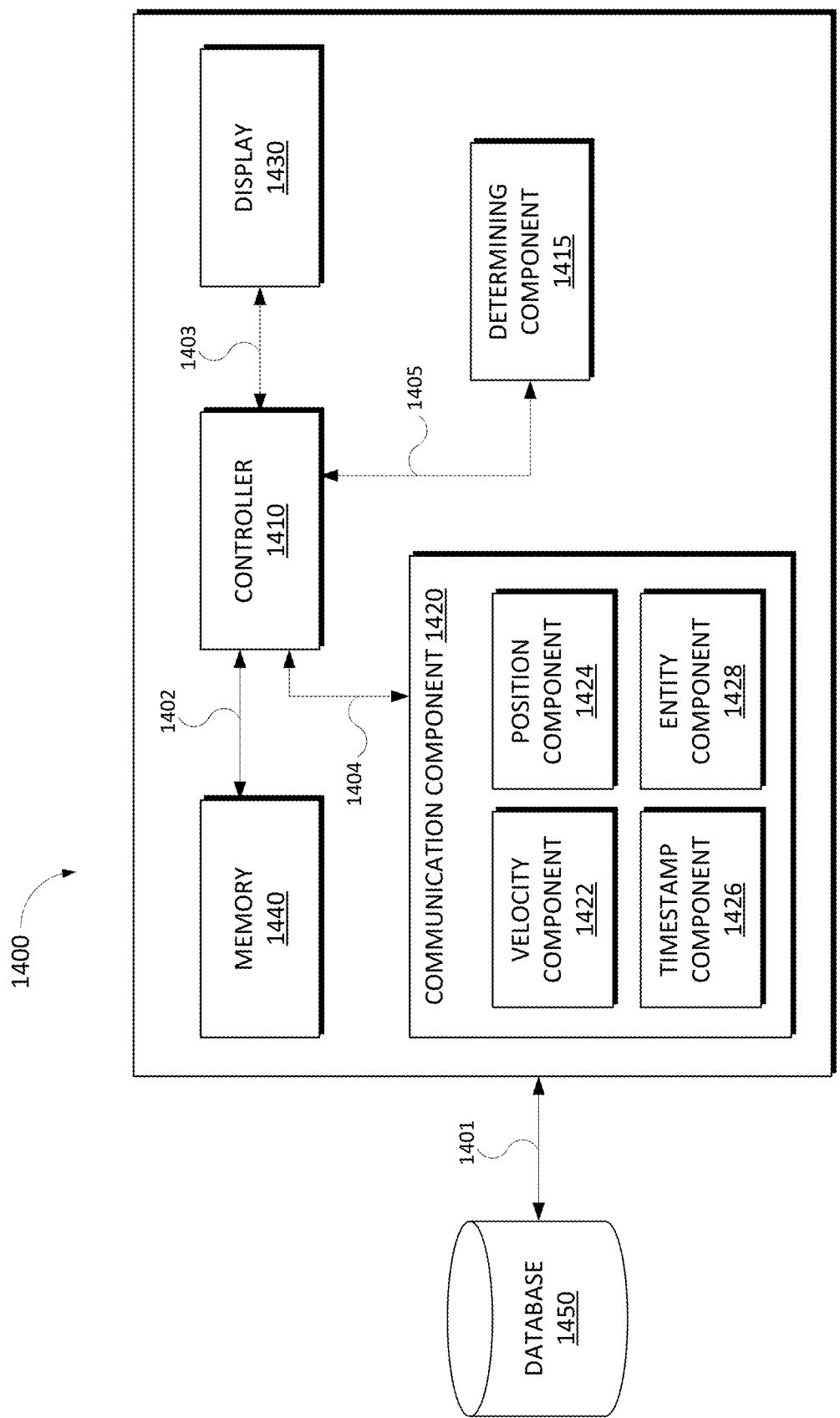
FIG. 14 shows a block diagram of an embodiment of a system in accordance with the subject matter of the present disclosure.

A system, such as the system shown in FIG. 14, may utilize software code to ingest data (e.g., AIS data), decompose the data, and save/output collections of motion abstracts.

FIG. 14 shows an embodiment of a system 1400 in accordance with the subject matter of the present disclosure. System 1400 is configured for kinematic-data abstraction, activity identification, entity classification, and entity identification, wherein kinematic data is decomposed using an ontology describing motion, activities are decomposed using an ontology describing activities, and entity classes are decomposed using an ontology describing entity classes having unique-entity instances.

System 1400 may include a communication component 1420 configured to receive from a database 1450 the kinematic data, which includes sets of data each having any/all of: an entity tag, a timestamp, a position vector, and a velocity vector. The kinematic data is received from database 1450 for the purpose of decomposing the data using the ontologies. Kinematic data may be provided in a form chosen from various types of data including, but not limited to: track data, AIS data, ADS-B data, and geolocation and time (GLT) data (e.g., GPS). Communication component 1420 may include a velocity component 1422, a position component 1424, a timestamp component 1426, and an entity component 1428. The components 1422-1428 are configured as data receiving components for the respective described data types. A controller 1410 may be configured to sequentially process the received kinematic data utilizing the ontology describing motion, which includes allowed motion states for a domain of interest. The sequential processing may provide sequences of motion states with metadata including motion details. The motion details may include any/all of the following: time, position, velocity, proximity to other entities, and proximity to other regions. A determining component 1415 may be configured to process the sequences of motion states, and the processing may include: identifying an activity of an entity utilizing the ontology describing activities; classifying an entity class utilizing the ontology describing entity classes; and identifying the entity utilizing archived motion-state sequences. In some embodiments, determining component 1415 may be a module or component within controller 1410.

A display 1430 may be configured to output results showing motion-abstract patterns with relative distributions of the patterns ordered within an ontology and taxonomy based on the decomposed kinematic data. System 1400 may output results in a manner and using means other than display 1430, such as outputting results to other systems or devices via wired or wireless communication.

Memory 1440 may be non-transitory storage media configured to store/save data at various times/stages with respect to the functions of system 1400. The processing of kinematic data may include storing, transmitting, receiving, recalling, replacing/overwriting, and deleting saved data as appropriate. In some embodiments, memory 1440 may be within controller 1410. In other embodiments, controller 1410 may have memory/cache in addition to memory 1440.

Communication channels 1401, 1402, 1403, 1404, and 1405 may be any type of various communication channels, examples including wireless and wired communication channels. Communication channels 1401-1405 are utilized for communication between the various components of system 1400 to send and receive data/information.

In some embodiments, system 1400 may be implemented as a processor or computer having non-transitory computer-readable media for carrying or having computer-executable instructions or data structures stored thereon. Examples of such non-transitory computer-readable media may include physical storage and/or memory such as RAM, ROM, EEPROM, CD/DVD-ROM or other optical storage, magnetic disk or other magnetic storage devices, SSD, or any other medium that can be used to carry or store desired computer-executable instructions or data structures. In other embodiments, system 1400 may be implemented as a singular device having components and/or modules to perform the functions described.

In some embodiments, the kinematic-data abstraction may be based at least in part on utilizing tolerances and thresholds of motion states to determine between whether a datum in one of the sets of data is consistent with a current motion state and whether the datum is indicative of a new motion state.

In some embodiments, the kinematic-data abstraction may be based at least in part on utilizing dead-reckoning techniques from time-stamped position data, and the velocity vector data may not be utilized.

In some embodiments, the kinematic-data abstraction may be based at least in part on utilizing a taxonomy of the ontology describing motion, as shown in the example provided in FIG. 2. The taxonomy is constrained by specific ontological exclusions when a particular motion state is followed by another particular motion state, e.g., "Waypoint Maneuver" follows "Change Of Direction," which follows "Nonlinear." The ontology describing motion may pertain to a particular domain (such as the maritime domain used in the example of FIG. 2). In the maritime domain example, the motion states may be constrained to a marine surface and physically allowed positions, velocities, and accelerations.

In other embodiments, other domains may be utilized for the ontology describing motion. For example, the ontology describing motion may pertain to the ground domain, and the motion states may be constrained to a local topology and physically allowed positions, velocities, and accelerations. Another example may be where the ontology describing motion pertains to the aerial domain, and the motion states are con-strained a local topology, atmospheric height, and physically allowed positions, velocities, and accelerations. Other domains may pertain to environments such as underwater or outer space.

Figure 15:
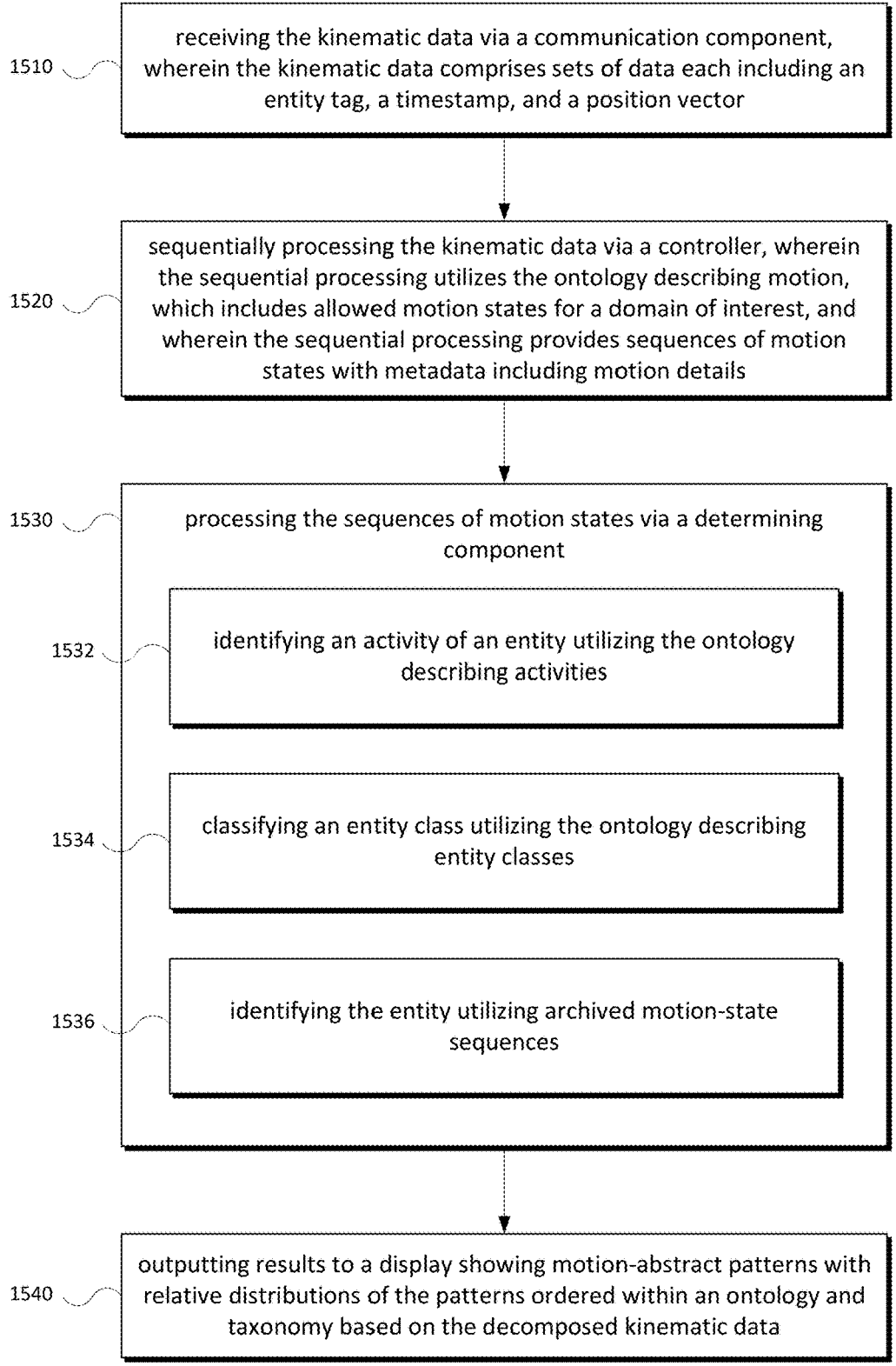
FIG. 15 shows a flowchart of an embodiment of a method in accordance with the subject matter of the present disclosure.

FIG. 15 shows a flowchart of an embodiment of a method in keeping with previously described system 1400. Method 1500 may be implemented as a series of modules, and the modules may function in concert with physical electronic and computer hardware devices. Such modules may be utilized separately and/or together, locally and/or remotely, to form a program product thereof, which may be implemented through recordable media. Some or all of the steps of method 100 may be stored within non-transitory computer-readable media, wherein the steps are represented by computer-readable programming code.

For illustrative purposes, method 1500 may be discussed with reference to FIG. 14 and various other figures. Additionally, while FIG. 15 shows an embodiment of method 1500, other embodiments of method 1500 may contain fewer or additional steps. Although in some embodiments the steps of method 1500 may be performed as shown in FIG. 15, in other embodiments the steps may be performed in a different order, or certain steps may occur simultaneously with one or more other steps. Certain portions of method 1500 that are identical or substantially similar to aspects of previously described system 1400 may not be further described.

Method 1500 may be used for kinematic-data abstraction, activity identification, entity classification, and entity identification, wherein kinematic data is decomposed using an ontology describing motion, activities are decomposed using an ontology describing activities, and entity classes are decomposed using an ontology describing entity classes having unique-entity instances. Step 1510 includes receiving the kinematic data via communication component 1420, wherein the kinematic data comprises sets of data each including an entity tag, a timestamp, and a position vector. The entity tag may identify a sequence of kinematic data for a single entity.

Step 1520 includes sequentially processing the kinematic data via controller 1410, wherein the sequential processing utilizes the ontology describing motion, which includes allowed motion states for a domain of interest, and wherein the sequential processing provides sequences of motion states with metadata including motion details.

Step 1530 includes processing the sequences of motion states, via determining component 1415. The processing performed at step 1530 may include various sub-steps, including: identifying an activity of an entity utilizing the ontology describing activities (at step 1532); classifying an entity class utilizing the ontology describing entity classes (at step 1534), and identifying the entity utilizing archived motion-state sequences (at step 1536).

Step 1540 includes outputting results to display 1430 showing motion-abstract patterns with relative distributions of the patterns ordered within an ontology and taxonomy based on the decomposed kinematic data.

In some embodiment, the motion details may include any/all of: time, position, velocity, proximity to other entities, and proximity to other regions.

In some embodiments, the kinematic data is provided a particular form such as track data, AIS data, ADS-B data, and geolocation and time (GLT) data. The sets of data may also include a velocity vector.

In some embodiments, the kinematic data may be provided as velocity data that is entity-tagged and time-stamped—relative positions of the entity may be derived from the velocity data. Whereas in other embodiments, the kinematic-data abstraction is based at least in part on utilizing dead-reckoning techniques from time-stamped position data, and velocity data may not be utilized.

In some embodiments, the kinematic-data abstraction is based at least in part on utilizing tolerances and thresholds of motion states to determine between whether a datum in one of the sets of data is consistent with a current motion state and whether the datum is indicative of a new motion state.

In some embodiments, the kinematic-data abstraction is based at least in part on utilizing a taxonomy of the ontology describing motion. The taxonomy may be constrained by specific ontological exclusions when a particular motion state is followed by another particular motion state.

In some embodiments, the processing the sequences of motion states may be obtained via a machine-learning technique such as: likelihood methods, decision trees, random forests, neural networks, and/or recurrent neural networks (RNNs). Whereas in other embodiments, the processing the sequences of motion states may be obtained based at least in part on one of: activity models and entity-class models (e.g., if a particular activity pattern is modeled to be associated primarily with a particular entity class or instance, then a lookup table may be used to identify the class or instance without utilizing a machine-learning technique).

Experimental Results

Figure 8:
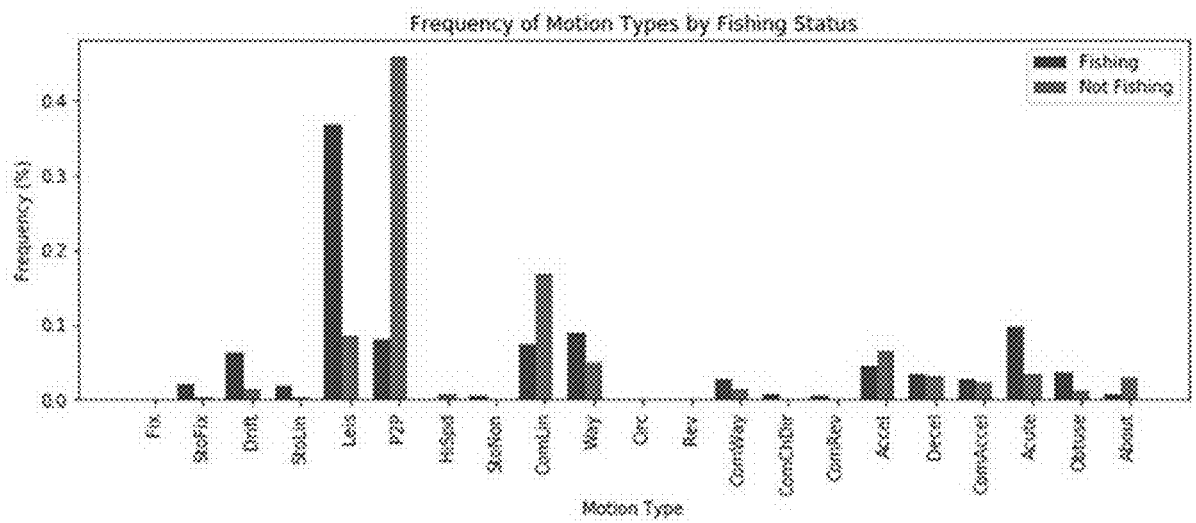
FIGS. 8-10 show experimental results pertaining to motion abstracts computed for data sets using machine-learning techniques.

Motion abstracts may be computed for datasets using machine-learning methods (e.g., k-NN, decision trees, and random forests). The example results shown in FIG. 8 have assigned labels (i.e., "fishing" and "not fishing") if all or all-but-one individual labels agree. FIG. 8 shows the distribution of motion states for the labels. Discrimination is especially clear for linear classes, as well as for change-of-direction nonlinear types.

Figure 9:
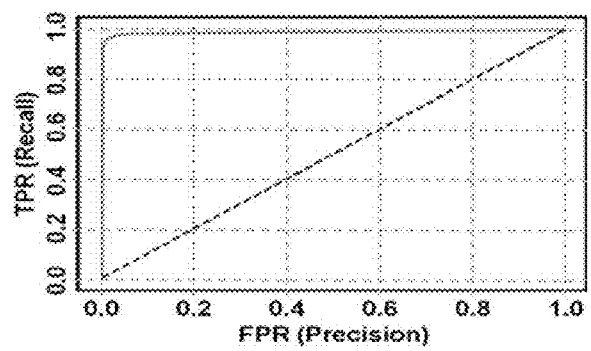

With respect to kinematic data, a random forest may be trained with a focus on the speed-over-ground (SOG), latitude, and longitude of each data point. The training set may be balanced for the "fishing" and "not fishing" labels, while ignoring unknown labels. From the example results shown in FIG. 9, an area-under-curve (AUC) of 0.991 is attainable and indicates the viability of kinematics as a discriminator for activity identification.

Figure 10:
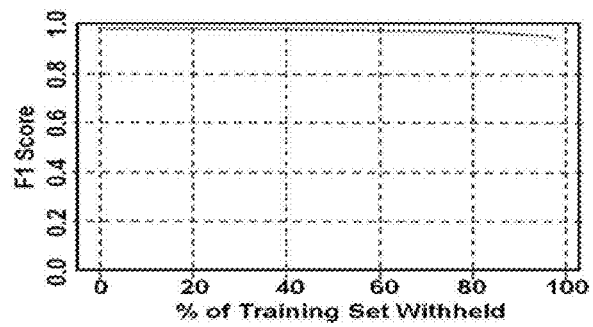

FIG. 10 shows sampling-degradation results pertaining to how results degraded with decreased sampling rate, wherein the random-forest algorithm had a decreased F1 score as the percentage of the training set was decreased.

Vessel classification is closely related to activity identification—it may be expected that fishing vessels engage in fishing, dredgers dredge, and cargo ships haul cargo for significant portions of their active periods. Nevertheless, there are periods of commonality regarding activity in comparison with other ship classes, e.g., arriving at port, docking, being tugged, etc. The kinematics of a particular vessel may have significant discrimination power to determine its class/type and expose anomalous behavior.

Figures 11A, 11B:
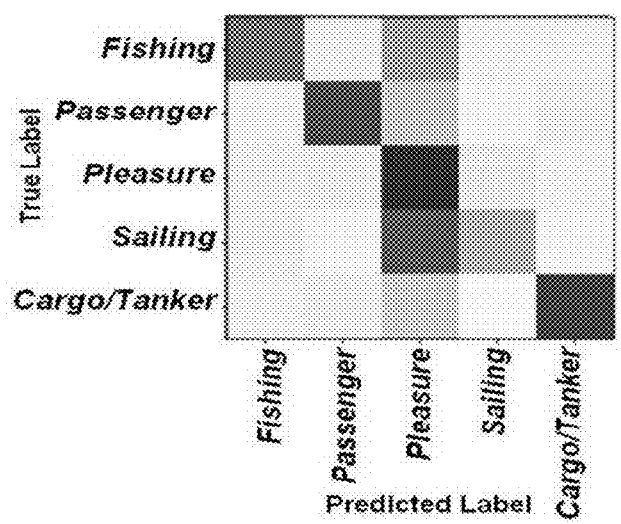
FIGS. 11A-11B show experimental results based on path shape and supervised RNNs.

Another approach to motion abstraction is to classify vessels based solely on path shape. RNNs are useful in such scenarios given their performance in similar temporal prediction and discrimination tasks. The results shown in FIG. 11A indicate discrimination between the classes. FIG. 11B shows a corresponding confusion matrix. Pleasure vessels present this method with the most confusion (likely because their paths are somewhat random or chaotic compared to other vessels). To be noted, however, is that no hyper-parameter optimization was performed on this set, and separating out deep-sea paths from in-harbor paths may improve the results.

Figures 12A, 12B:
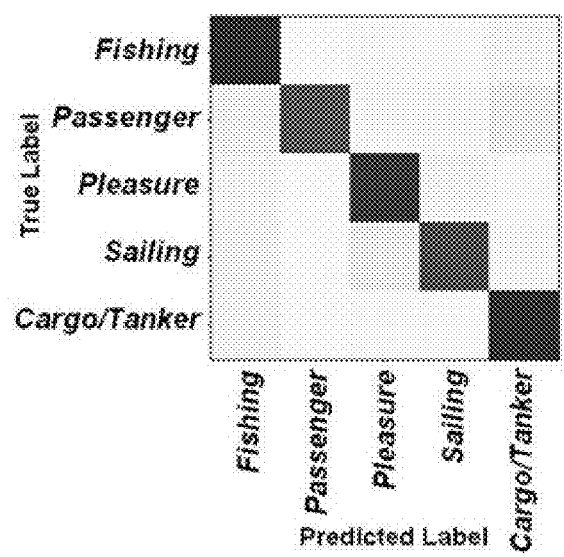
FIG. 12A-12B show experimental results based on position information and supervised random forests.

A random forest was trained on AIS data using only position information. FIG. 12A displays the discrimination results, and FIG. 12B shows the corresponding confusion matrix. The results are indicative of the behavior of the vessels at issue—fishing vessels spend their time in fishing areas, tankers and cargo ships spend their time in shipping lanes, and passenger vessels spend their time along their predetermined routes. This technique may serve as an initial anomaly check in specific areas but may be less robust in diverse-population areas such as in and near ports.

Figures 13A, 13B, 13C:
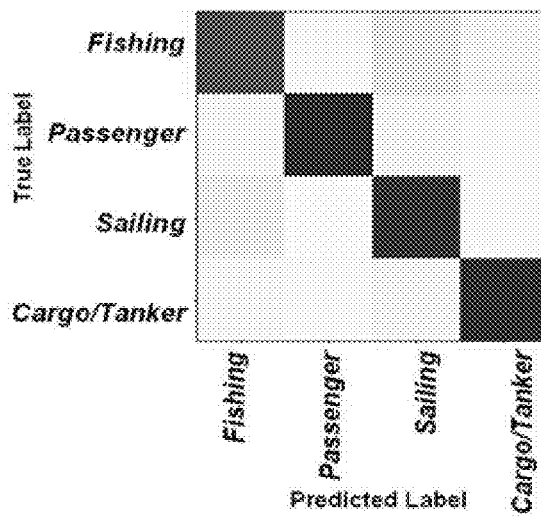
FIG. 13A-13C show experimental results based on motion abstracts, k-NNs, and RNNs.

In some examples, short sequences of eight motion abstracts were used to train k-NNs and RNNs. In FIG. 13A are presented the performance results of the k-NN. (In addition, an approximate nearest neighbor algorithm using multidimensional indexes was run on the same data with similar results but with predict times improved by over an order of magnitude.) The results show discrimination ability significantly above random choice (0.20). The confusion matrix (not shown) is marginal.

An RNN was also trained on the aforementioned motion-abstract sequences. The performance numbers are shown in FIG. 13B and the corresponding confusion matrix in FIG. 13C. Before doing hyper-parameter optimization, the results were comparable to the k-NN; however, the hyper-parameter optimization improved performance and showed discrimination of vessel classes based solely on sequences of motion types.

The use of any examples, or example-language ("e.g.," "such as," etc.), provided herein is merely intended to better illuminate and is not intended to pose a limitation on the scope of the subject matter unless otherwise claimed. No language in the present disclosure should be construed as indicating that any non-claimed element is essential or intended to limit the appended claims.

Many modifications and variations of the subject matter of the present disclosure are possible in light of the above description. Within the scope of the appended claims, the embodiments of the system and method described herein may be practiced otherwise than as specifically described. The scope of the claims is not limited to the disclosed implementations and embodiments but extends to other implementations and embodiments as may be contemplated by those having ordinary skill in the art.

What is claimed is:

1. A method for kinematic-data abstraction, activity identification, entity classification, and entity identification, wherein kinematic data is decomposed using an ontology describing motion, activities are decomposed using an ontology describing activities, and entity classes are decomposed using an ontology describing entity classes having unique-entity instances, the method consisting of:
   receiving the kinematic data via a communication component, wherein the kinematic data comprises sets of data each including an entity tag, a timestamp, a velocity vector, and a position vector in a form selected from the group consisting of radar track data, AIS data, ADS-B data, geolocation and time (GLT) data, and combinations thereof;
   sequentially processing the kinematic data via a controller, wherein the sequential processing utilizes the ontology describing motion, which includes allowed motion states for a domain of interest, and wherein the sequential processing provides sequences of motion states with metadata including motion details;
   processing the sequences of motion states, via a determining component, wherein the processing includes:
      identifying an activity of an entity utilizing the ontology describing activities,
      classifying an entity class utilizing the ontology describing entity classes, and
      identifying the entity utilizing archived motion-state sequences; and
   outputting results to a display showing motion-abstract patterns with relative distributions of the patterns ordered within an ontology and taxonomy based on the decomposed kinematic data.

2. The method of claim 1, wherein the motion details include at least four of: time, position, velocity, proximity to other entities, and proximity to other regions.

3. The method of claim 1, wherein the entity tag identifies a sequence of kinematic data for a single entity.

4. The method of claim 1, wherein the kinematic data is provided as velocity data that is entity-tagged and time-stamped, and wherein relative positions the entity are derived from the velocity data.

5. The method of claim 1, wherein the kinematic-data abstraction is based at least in part on utilizing tolerances and thresholds of motion states to determine between whether a datum in one of the sets of data is consistent with a current motion state and whether the datum is indicative of a new motion state.

6. The method of claim 1, wherein the kinematic-data abstraction is based at least in part on utilizing dead-reckoning techniques from time-stamped position data, and wherein velocity data is not utilized.

7. The method of claim 1, wherein the kinematic-data abstraction is based at least in part on utilizing a taxonomy of the ontology describing motion, wherein the taxonomy is constrained by specific ontological exclusions when a particular motion state is followed by another particular motion state.

8. The method of claim 7, wherein the ontology describing motion pertains to a maritime domain, and wherein the motion states are constrained to a marine surface and physically allowed positions, velocities, and accelerations.

9. The method of claim 7, wherein the ontology describing motion pertains to the ground domain, and wherein the motion states are constrained to a local topology and physically allowed positions, velocities, and accelerations.

10. The method of claim 7, wherein the ontology describing motion pertains to the aerial domain, and wherein the motion states are constrained a local topology, atmospheric height, and physically allowed positions, velocities, and accelerations.

11. The method of claim 1, wherein the processing the sequences of motion states is obtained via a machine-learning technique chosen from at least one of: likelihood methods, decision trees, random forests, neural networks, and recurrent neural networks (RNNs).

12. The method of claim 1, wherein the processing the sequences of motion states is obtained based at least in part on one of: activity models and entity-class models.

13. The method of claim 1, wherein the processing includes storing, transmitting, receiving, recalling, replacing, overwriting, and deleting data from a memory.

14. The method of claim 1, wherein the kinematic data is received from a database including the sets of data.

15. A method for kinematic-data abstraction, activity identification, entity classification, and entity identification, wherein kinematic data is decomposed using an ontology describing motion, activities are decomposed using an ontology describing activities, and entity classes are decomposed using an ontology describing entity classes having unique-entity instances, the method comprising:
   receiving the kinematic data via a communication component, wherein the kinematic data is received from a database including sets of data where each set of data includes an entity tag, a timestamp, a velocity vector, and a position vector in a form selected from the group consisting of AIS data, ADS-B data, geolocation and time (GLT) data, and combinations thereof;

sequentially processing the kinematic data via a controller, wherein the sequential processing utilizes the ontology describing motion, which includes allowed motion states for a domain of interest, and wherein the sequential processing provides sequences of motion states with metadata including motion details;

processing the sequences of motion states, via a determining component, wherein the processing includes:
  identifying an activity of an entity utilizing the ontology describing activities,
  classifying an entity class utilizing the ontology describing entity classes, and
  identifying the entity utilizing archived motion-state sequences; and outputting results to a display showing motion-abstract patterns with relative distributions of the patterns ordered within an ontology and taxonomy based on the decomposed kinematic data.

16. The method of claim 15, wherein the ontology describing motion pertains to the maritime domain, and wherein the motion states are constrained to a marine surface and physically allowed positions, velocities, and accelerations.

17. The method of claim 8, wherein identifying the entity utilizing archived motion-state sequences includes a ship name and ship type selected from the group consisting of tugs, passenger vessels, sailing vessels, pleasure craft, tankers, cargo vessels, and fishing vessels.

18. The method of claim 8, wherein identifying the entity utilizing archived motion-state sequences includes a ship name and ship type selected from the group consisting of dredgers vessels, tender vessels, pilot vessels, passenger vessels, sailing vessels, pleasure vessels, cargo vessels, tanker vessels, and fishing vessels.

* * * * *